United States Patent
Min et al.

(10) Patent No.: US 9,064,432 B2
(45) Date of Patent: Jun. 23, 2015

(54) DISPLAY DEVICE

(71) Applicant: LG ELECTRONICS INC., Seoul (KR)

(72) Inventors: Bumgi Min, Seoul (KR); Kyoungmok Kim, Seoul (KR); Junho Ko, Seoul (KR); Junseok Tak, Seoul (KR); Seongrae Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 13/689,164

(22) Filed: Nov. 29, 2012

(65) Prior Publication Data

US 2014/0055983 A1 Feb. 27, 2014

(30) Foreign Application Priority Data

Aug. 24, 2012 (KR) .................. 10-2012-0092794

(51) Int. Cl.
  *G09F 13/04* (2006.01)
  *G02F 1/1333* (2006.01)
  *G02F 1/1335* (2006.01)

(52) U.S. Cl.
  CPC .......... *G09F 13/04* (2013.01); *G02F 1/133308* (2013.01); *G02F 1/133504* (2013.01)

(58) Field of Classification Search
  CPC .......................... G09F 11/04; G02F 1/13308
  USPC .............................................. 362/97.1, 97.2
  See application file for complete search history.

(56) References Cited

U.S. PATENT DOCUMENTS

| 2002/0080298 | A1  | 6/2002  | Fukayama |
| 2007/0013827 | A1* | 1/2007  | Fang .................. 349/58 |
| 2008/0303979 | A1  | 12/2008 | Shimizu |
| 2010/0165236 | A1  | 7/2010  | Bae et al. |

FOREIGN PATENT DOCUMENTS

| EP | 2 045 653 A1   | 4/2009 |
| EP | 2 447 762 A2   | 5/2012 |
| WO | WO 2012/070332 A1 | 5/2012 |

OTHER PUBLICATIONS

Extended European Search Report for International Application No. 12007968.6 dated Dec. 3, 2013.

* cited by examiner

*Primary Examiner* — David V Bruce
(74) *Attorney, Agent, or Firm* — Birch, Stewart, Kolasch & Birch, LLP

(57) ABSTRACT

A display device includes a display panel including a front substrate and a back substrate, a back cover positioned in the rear of the display panel, and a backlight unit positioned between the display panel and the back cover. The backlight unit includes a plurality of optical sheets. At least first optical sheet of the plurality of optical sheets includes an opening. At least second optical sheet of the other optical sheets except the first optical sheet among the plurality of optical sheets includes a protrusion corresponding to the opening of the first optical sheet.

24 Claims, 39 Drawing Sheets (A)　　　　(B)　　　　(C)

(A)

(B)

DISPLAY DEVICE

This application claims the benefit of Korean Patent Application No. 10-2012-0092794 filed on Aug. 24, 2012, the entire contents of which is incorporated herein by reference for all purposes as if fully set forth herein.

BACKGROUND OF THE INVENTION

1. Field of the Invention

Embodiments of the invention relate to a display device.

2. Discussion of the Related Art

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices. Among the display devices, a liquid crystal display panel of the liquid crystal display includes a liquid crystal layer, and a thin film transistor (TFT) substrate and a color filter substrate that are positioned opposite each other with the liquid crystal layer interposed therebetween. The liquid crystal display panel displays an image using light provided by a backlight unit of the liquid crystal display.

FIG. 1 illustrates a related art display device.

As shown in FIG. 1, a related art display device includes a display panel 100P including a front substrate and a back substrate, an optical layer 120P disposed in the rear of the display panel 100P, a frame 130P disposed in the rear of the optical layer 120P, first and second fastening parts 160P and 170P for fastening the display panel 100P, the optical layer 120P, and the frame 130P, a protective substrate 110P disposed in the front of the display panel 100P, a third fastening part 150P for fastening the protective substrate 110P, and a back cover 140P which is connected to the third fastening part 150P and is disposed in the rear of the frame 130P.

The related art display device has the complicated structure disclosed herein, and also it is difficult to achieve a thin profile of the related art display device. Further, visibility of the related art display device is reduced.

SUMMARY OF THE INVENTION

In one aspect, there is a display device including a display panel including a front substrate and a back substrate, a back cover positioned in the rear of the display panel, and a backlight unit positioned between the display panel and the back cover, the backlight unit including a plurality of optical sheets, wherein at least first optical sheet of the plurality of optical sheets includes an opening, wherein at least second optical sheet of the other optical sheets except the first optical sheet among the plurality of optical sheets includes a protrusion corresponding to the opening of the first optical sheet.

In another aspect, there is a display device including a display panel including a front substrate and a back substrate, a back cover positioned in the rear of the display panel, a backlight unit positioned between the display panel and the back cover, the backlight unit including a plurality of optical sheets, and a side cover covering the side of the display panel, wherein at least first optical sheet of the plurality of optical sheets includes an opening, wherein at least second optical sheet of the other optical sheets except the first optical sheet among the plurality of optical sheets includes a protrusion corresponding to the opening of the first optical sheet.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
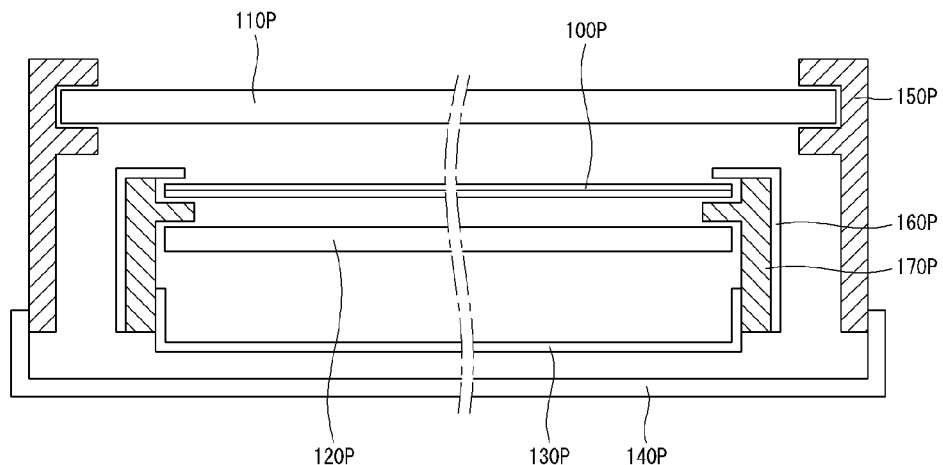
FIG. 1 illustrates a related art display device.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, a liquid crystal display panel is used as an example of a display panel. Other display panels may be used. For example, a plasma display panel (PDP), a field emission display (FED) panel, and an organic light emitting diode (OLED) display panel may be used.

FIGS. 2 to 5 illustrate a configuration of a display device according to an example embodiment of the invention.

Figure 2:
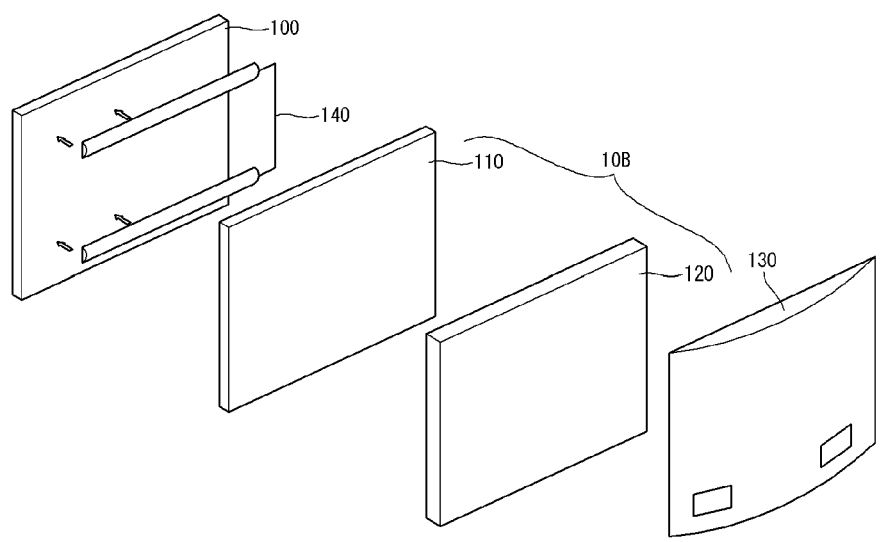
FIGS. 2 to 12 illustrate a configuration of a display device according to an example embodiment of the invention.

As shown in FIG. 2, a display device according to an example embodiment of the invention may include a display panel 100, a backlight unit 10B including an optical sheet part 110 and a light source 120, and a back cover 130. And, the display device further includes a bracket 140.

The display panel 100 displaying an image may include a front substrate and a back substrate that are positioned opposite each other. The bracket 140 may be attached to a non-display area of a back surface of the back substrate of the display panel 100.

The optical sheet part 110 may be disposed between the back substrate and the back cover 130. The optical sheet part 110 may not be fixed to the bracket 140.

Alternatively, the optical sheet part 110 may be fixed to the bracket 140.

The optical sheet part 110 may include a plurality of sheets. For example, although not shown, the optical sheet part 110 may include at least one of a prism sheet and a diffusion sheet.

The backlight unit 10B may be disposed in the rear of the display panel 100. Although not shown, the backlight unit 10B may further include a frame as well as the light source 120. In the embodiment disclosed herein, the backlight unit 10B includes the light source 120, the optical sheet part 110, and the frame (not shown). However, the backlight unit 10B may include a light guide plate (not shown). Further, in the embodiment disclosed herein, the backlight unit 10B may be used as the light source 120 and thus may indicate the light source 120. In other words, the backlight unit 10B may be referred to as the light source.

The configuration of the backlight unit may be variously changed.

Various types of light sources 120 may be used in the embodiment of the invention. For example, the light source may be one of a light emitting diode (LED) chip and a LED package having at least one LED chip. In this instance, the light source may be a colored LED emitting at least one of red, green, and blue light or a white LED.

Although the embodiment of the invention describes the direct type backlight unit 10B as an example, an edge type backlight unit may be used.

The back cover 130 may be positioned in the rear of the backlight unit 10B. The back cover 130 may protect the backlight unit 10B and the other part of the display device from an impact or a pressure applied from the outside.

The optical sheet part 110 may be closely attached to the display panel 100. Alternatively, the optical sheet part 110 may be separated from the display panel 100 by a predetermined distance.

The display panel 100 may include a front substrate 101 and a back substrate 111, that are positioned opposite each other and attached to each other to form a uniform cell gap therebetween. A liquid crystal layer (not shown) may be formed between the front substrate 101 and the back substrate 111.

The liquid crystal layer may include a plurality of liquid crystal molecules, and the arrangement of the liquid crystal molecules may change in response to a driving signal supplied by a transistor (not shown). Hence, light from the backlight unit 10B may be incident on a color filter (not shown) based on changes in the molecular arrangement of the liquid crystal layer. As a result, the color filter may implement red, green, and blue light, and thus a predetermined image may be displayed on the front substrate 101 of the display panel 100.

Figure 3:
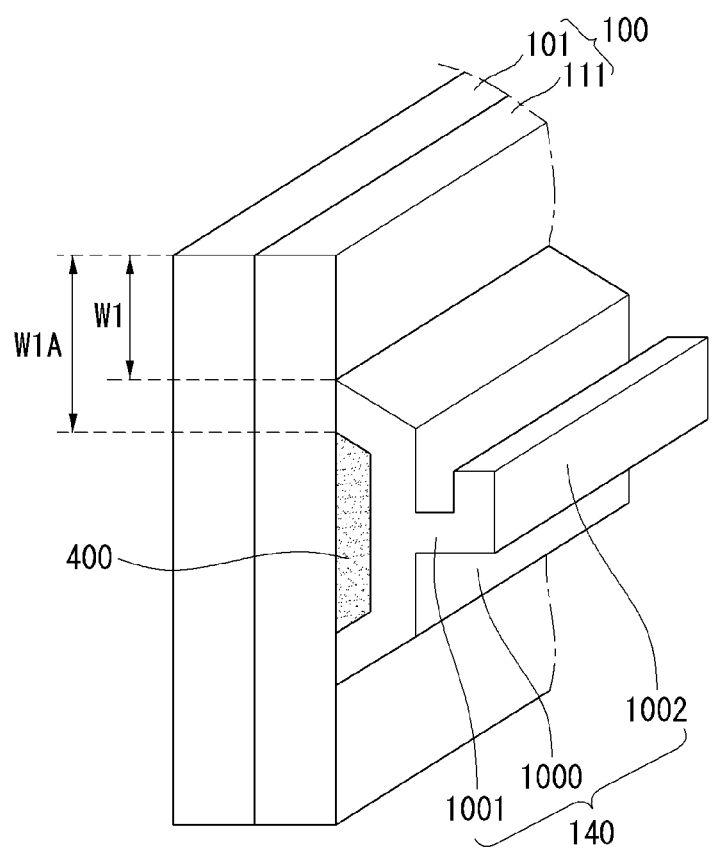

As shown in FIG. 3, an adhesive layer 400 may be formed between the back surface of the back substrate 111 of the display panel 100 and the bracket 140. The bracket 140 may be attached to the back surface of the back substrate 111 of the display panel 100 using the adhesive layer 400.

As above, when the bracket 140 is attached to the back surface of the back substrate 111 using the adhesive layer 400, a supporter such as a pem nut and a boss and a fastener such as a screw are not used to fasten the bracket 140 to the back substrate 111. Therefore, a fixing process may be simply performed, the manufacturing cost may be reduced, and the thickness of the display device may be reduced.

A groove 141 may be formed in one surface of the bracket 140 opposite the back substrate 111, so as to improve an adhesive strength between the bracket 140 and the back substrate 111. It may be preferable that the adhesive layer 400 is formed in the groove 141. In this instance, because the groove 141 may prevent an adhesive material of the adhesive layer 400 from being discharged to the outside of the bracket 140, an attaching process may be easily performed.

As above, when the bracket 140 is attached to the back surface of the back substrate 111, the display panel 100 may include a portion W1A extending further than the adhesive layer 400 in a longitudinal direction of the display panel 100. Further, the display panel 100 may include a portion W1 extending further than the bracket 140 in the longitudinal direction.

The shape of the bracket 140 may be variously changed.

Figure 4:
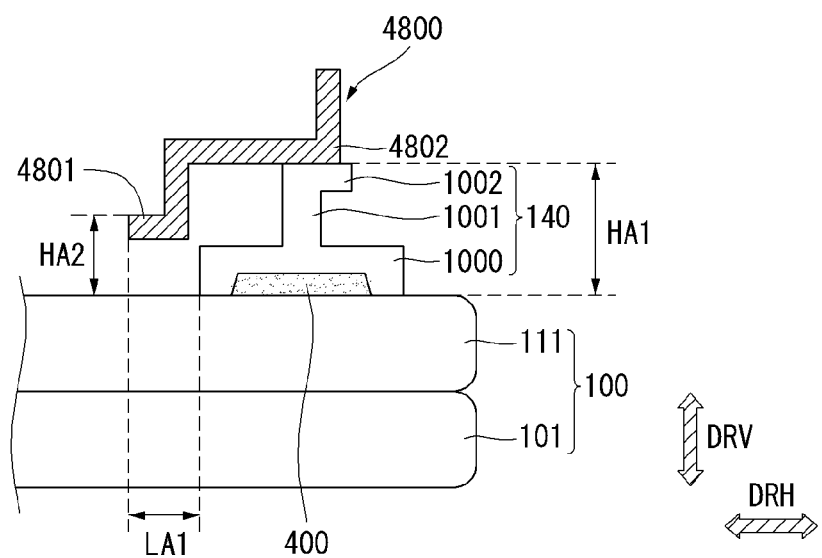

For example, as shown in FIG. 4, the bracket 140 may include a base 1000, a head 1002, and a pillar 1001 for connecting the base 1000 to the head 1002. The adhesive layer 400 may be disposed between the base 1000 of the bracket 140 and the back substrate 111.

In other words, the bracket 140 has a depression (or groove) on a first surface where the adhesive layer 400 is applied. The bracket 140 has a first protrusion 1001 (i.e., the pillar) extending from a second surface opposite the first surface and a second protrusion (i.e., the head) 1002 extending from the first protrusion 1001. The first protrusion 1001 of the bracket 140 may extend away from the back substrate 111 in a width direction (i.e., a vertical direction DRV) of the back substrate 111. The second protrusion 1002 may extend from an end of the first protrusion 1001 in a horizontal direction DRH of the display panel such that the first and second protrusions 1001 and 1002 may form an inverted L-shape.

A width of the base 1000 providing a space for the adhesive layer 400 may be greater than a width of the head 1002.

Hereinafter, the embodiment of the invention is described on the assumption that the bracket 140 includes the base 1000, the head 1002, and the pillar 1001. Other structures of the bracket 140 may be used.

As shown in FIG. 4, an auxiliary bracket 4800 may be disposed on the bracket 140. More specifically, the auxiliary bracket 4800 may be disposed on the head 1002 of the bracket 140. In the embodiment disclosed herein, the bracket 140 may be referred to as a first bracket, and the auxiliary bracket 4800 may be referred to as a second bracket or a sheet supporter.

Further, the auxiliary bracket 4800 may include a potion 4801 positioned close to the back substrate 111. Hereinafter, the potion 4801 of the auxiliary bracket 4800 is referred to as the low altitude part 4801.

More specifically, when the height of the bracket 140 is measured from the back surface of the back substrate 111, a height HA2 of the low altitude part 4801 of the auxiliary bracket 4800 may be less than a maximum height HA1 of the bracket 140.

The low altitude part 4801 of the auxiliary bracket 4800 may extend further than the bracket 140 toward the middle direction of the display panel 100 by a predetermined distance LA1.

In other words, at least one auxiliary bracket 4800 may be provided adjacent to the plurality of brackets 140.

The at least one auxiliary bracket 4800 includes a first ledge 4802 and a second ledge 4801 extending in the horizontal direction DRH. The first and second ledges 4802 and 4801 may be spaced from each other by an extension extending in the vertical direction DRV, the extension being coupled to ends of the first and second ledges 4802 and 4801.

In this instance, the first ledge 4802 may be provided between the second protrusion 1002 and the frame (not shown) and may contact the frame. These are described in detail below.

Figure 5:
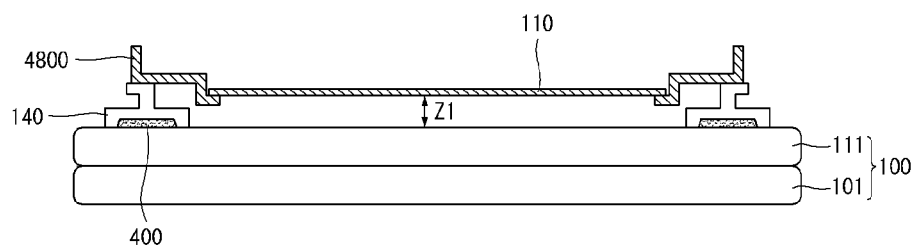

As shown in FIG. 5, the optical sheet part 110 between the display panel 100 and the back cover may be disposed on the auxiliary bracket 4800. For example, the optical sheet part 110 may be disposed on the low altitude part 4801 of the auxiliary bracket 4800.

The optical sheet part 110 may not be fixed to the auxiliary bracket 4800 and may be placed on the low altitude part 4801 of the auxiliary bracket 4800. In this instance, the optical sheet part 110 may move on the auxiliary bracket 4800.

As above, when the optical sheet part 110 is disposed on the auxiliary bracket 4800, the optical sheet part 110 may be separated from the back substrate 111 by a predetermined distance Z1. Hence, an air gap may be formed between the back substrate 111 and the optical sheet part 110.

As above, when the air gap is formed between the back substrate 111 and the optical sheet part 110, the optical characteristics of the display device may be improved by the air gap.

In the embodiment of the invention, the structure and the shape of the auxiliary bracket 4800 may be variously changed.

Figure 6:
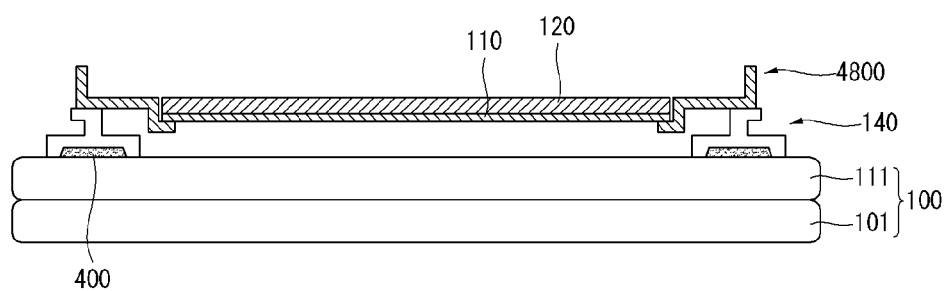

As shown in FIG. 6, the light source 120 may be disposed on the optical sheet part 110. The light source 120 may be disposed on the low altitude part 4801 of the auxiliary bracket 4800 along with the optical sheet part 110. In this instance, the backlight unit 10B has the direct type light source 120.

Figure 7:
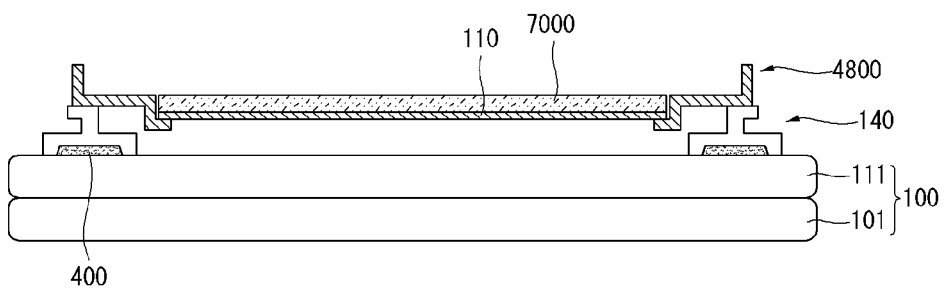

Alternatively, as shown in FIG. 7, a light guide plate 7000 may be disposed in the rear of the optical sheet part 110. In this instance, the backlight unit 10B may include the edge type light source. As above, when the backlight unit 10B includes the light guide plate 7000, the edge type light source may be disposed on the side of the light guide plate 7000.

As above, the display device according to the embodiment of the invention may include the direct type backlight unit or the edge type backlight unit. In other words, both the direct type backlight unit and the edge type backlight unit may be applied to the embodiment of the invention. The edge type backlight unit may be classified into a bottom edge type backlight unit including a bottom edge type light source and a side edge type backlight unit including a side edge type light source.

Figure 8:
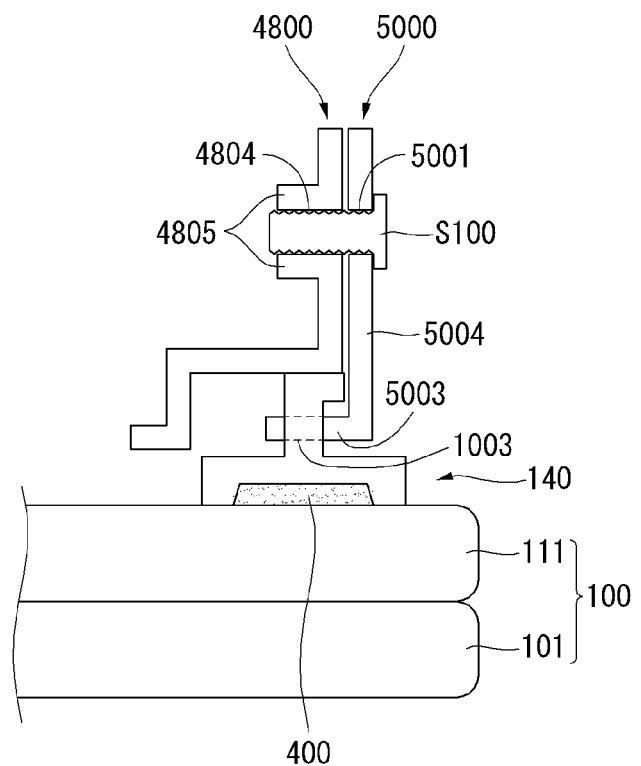

As shown in FIG. 8, a hole (or opening) 1003 may be formed in the bracket 140.

A connection frame 5000 may be connected to the bracket 140 through the hole 1003. The connection frame 5000 may not be fixed to the bracket 140, and a portion of the connection frame 5000 may be inserted into the hole 1003 of the bracket 140. Hence, an external pressure, for example, a twist transferred to the connection frame 5000 may be prevented from being transferred to the display panel 100 through the bracket 140, and a light leakage phenomenon may be further reduced.

In this instance, the auxiliary bracket 4800 may be provided adjacent to the plurality of brackets 140 and may be connected to the at least one connection frame 5000.

In other words, the connection frame 5000 has a side wall 5004 and a plurality of first tab portions 5003 extending in the horizontal direction DRH. The first tab portion 5003 may pass through the hole 1003 of the first protrusion of the bracket 140.

In this instance, a width of the first tab portion 5003 in the horizontal direction DRH may be greater than a width of the second protrusion of the bracket 140.

A hole 5001 may be formed in the connection frame 5000, and a hole 4804 corresponding to the hole 5001 of the connection frame 5000 may be formed in the auxiliary bracket 4800. A fastening member S100 such as a screw may connect the connection frame 5000 to the auxiliary bracket 4800 through the hole 5001 of the connection frame 5000 and the hole 4804 of the auxiliary bracket 4800. In other words, the connection frame 5000 may include the first tab portion 5003 inserted into a hole (or a groove) 1003 of the bracket 140 and the side wall 5004 fastened to the auxiliary bracket 4800.

The first tab portion 5003 of the connection frame 5000 may be a horizontal portion, and the side wall 5004 of the connection frame 5000 may be a vertical portion.

Figure 9:
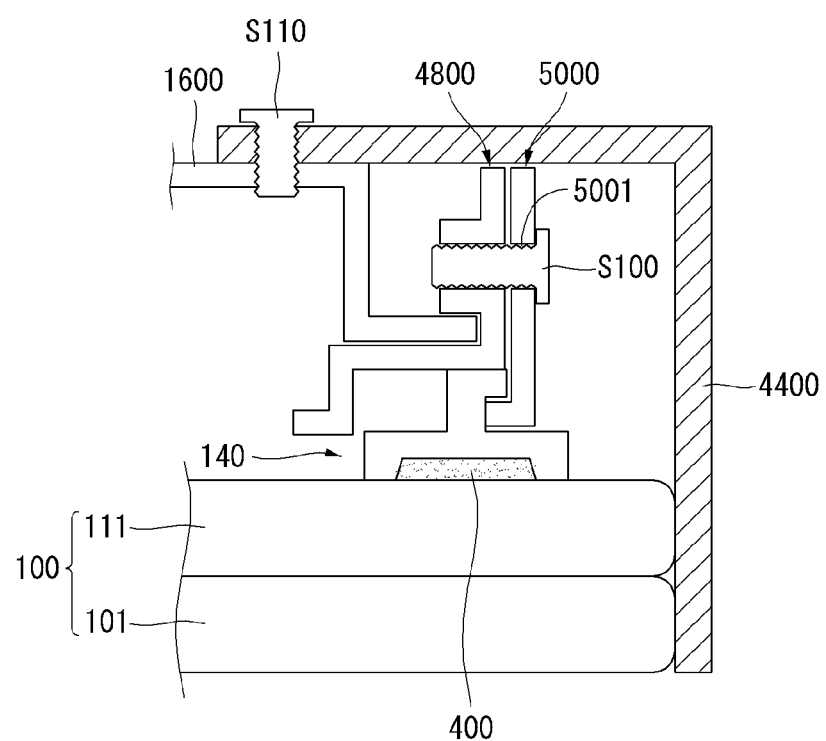

As shown in FIG. 9, a frame 1600 may be disposed between the back cover 130 and the display panel 100. The frame 1600 may include a portion positioned on the auxiliary bracket 4800. In the embodiment disclosed herein, the frame 1600 may be a frame included in the backlight unit or a frame separate from the backlight unit.

An end of the frame 1600 is positioned on the auxiliary bracket 4800. A portion of the frame 1600 may contact the auxiliary bracket 4800.

A side cover 4400 including a portion positioned on the side of the display panel 100 may be connected to the frame 1600.

For example, a predetermined fastening member S110 such as a screw may connect the frame 1600 to the side cover 4400.

The side cover 4400 may prevent a foreign material such as dust from being penetrated into the display device and may protect the side of the display panel 100 from a damage.

Figure 10:
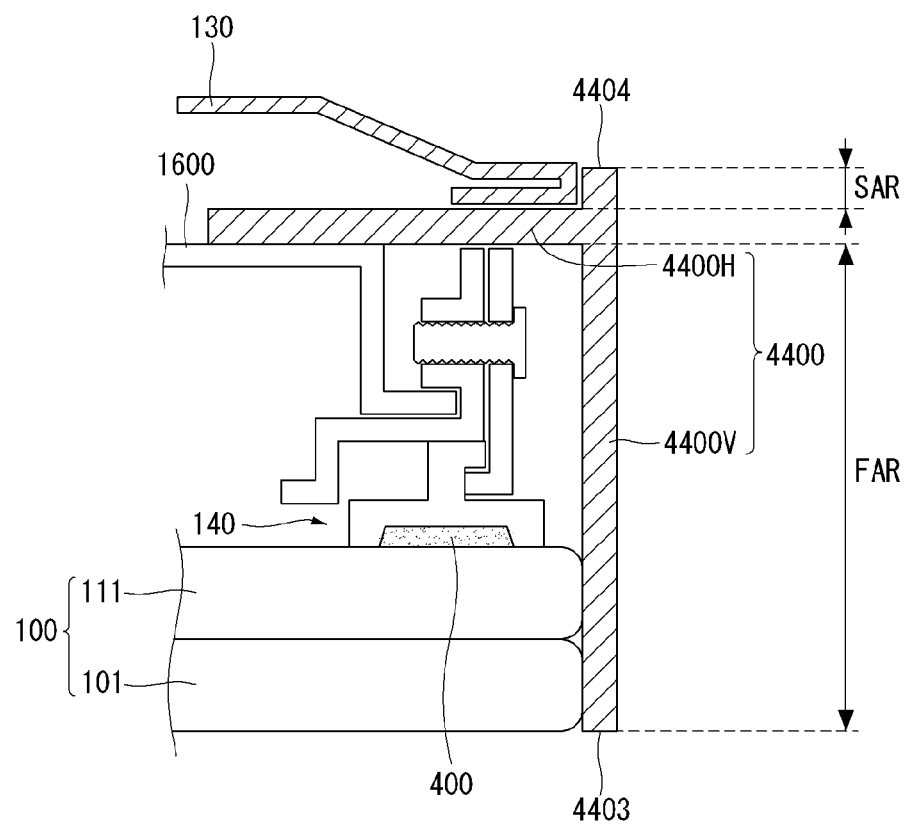

As shown in FIG. 10, the back cover 130 is disposed in the rear of the display panel 100 and may be connected to the side cover 4400.

A portion of the side cover 4400 may extend in the direction toward the middle of the display panel 100, so as to more efficiently fix the side cover 4400.

In this instance, the side cover 4400 may include a portion positioned between the back cover 130 and the display panel 100 in a width direction (i.e., a vertical direction) of the display panel 100.

As above, an edge of the front surface of the display panel 100 may be exposed in a state where the back cover 130 is connected to the side cover 4400. The exposure of the edge of the front surface of the display panel 100 may indicate that an edge of a front surface of a front polarizing film attached to the front substrate 101 is exposed. Alternatively, the exposure of the edge of the front surface of the display panel 100 may indicate that an edge of the front surface of the front substrate 101 is exposed.

In this instance, when the observer in the front of the display panel 100, for example, at a predetermined first position views the display panel 100, the observer may substantially observe the entire area of the display panel 100. Therefore, an attractive appearance of the display panel 100 may be provided. Further, because another edge of the side of the display panel 100 may not be shown to the observer, a visual effect, in which the observer may feel that the screen size of the display panel 100 is greater than the real screen size of the display panel 100, may be obtained.

In other words, the side cover 4400 may include a sidewall 4400V and an overhang portion 4400H extending in the horizontal direction DRH. A first end portion 4403 of the side cover 4400 may cover the sides of the front and back substrates 101 and 111. The overhang portion 4400H may be provided at a second end portion 4404 of the side cover 4400. The overhang portion 4400H may be separated from an end of the side cover 4400 by a predetermined distance SAR in the vertical direction DRV. In this instance, the side cover 4400 may provide a rim for preventing the detachment of the back cover 130.

In other words, the overhang portion 4400H may be provided between the first end portion 4403 and the second end portion 4404 of the side cover 4400 and may be separated from the first end portion 4403 and the second end portion 4404 by a predetermined distance. An end of the back cover 130 may be positioned adjacent to a joint between the sidewall 4400V and the overhang portion 4400H.

The sidewall 4400V may be referred to as a first portion or a vertical portion of the side cover 4400, and the overhang portion 4400H may be referred to as a second portion or a horizontal portion of the side cover 4400.

In other words, the sidewall 4400V of the side cover 4400 may include a first area FAR between the first end portion 4403 and the second end portion 4404 and a second area SAR between the second end portion 4404 and the overhang portion 4400H. An end of the back cover 130 may be positioned in the second area SAR. In this instance, the backlight unit and the display panel 100 may be positioned adjacent to the first area FAR.

Figure 11:
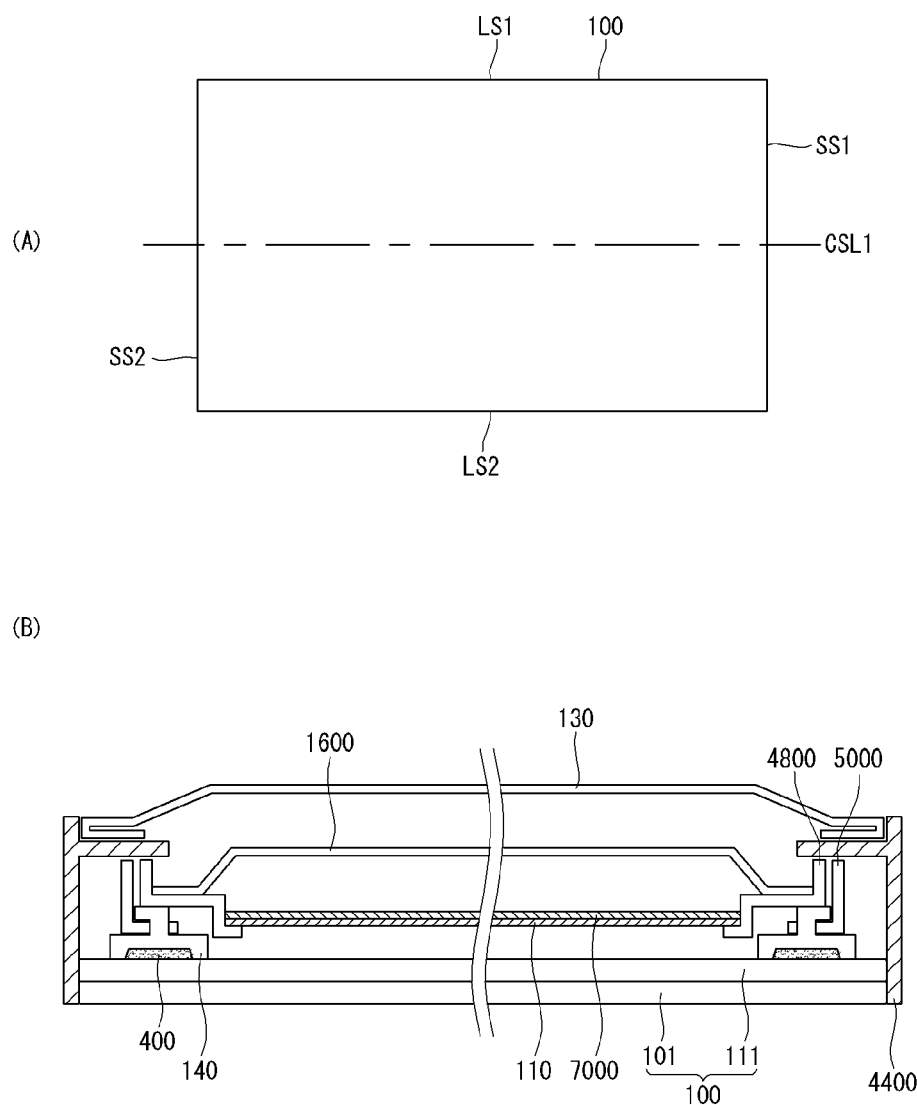

In (A) of FIG. 11 showing a cross section taken along a straight line CSL1 passing through first and second short sides SS1 and SS2 of the display panel 100, more specifically, as shown in (B) of FIG. 11, the side cover 4400 is disposed at each of both ends of the display device, and the back cover 130 is disposed in the rear of the display panel 100.

FIG. 11 is a schematic cross-sectional view of the display device according to the embodiment of the invention in the vertical direction. In the following description, the descriptions of the configuration and the structure described above are omitted.

Figure 12:
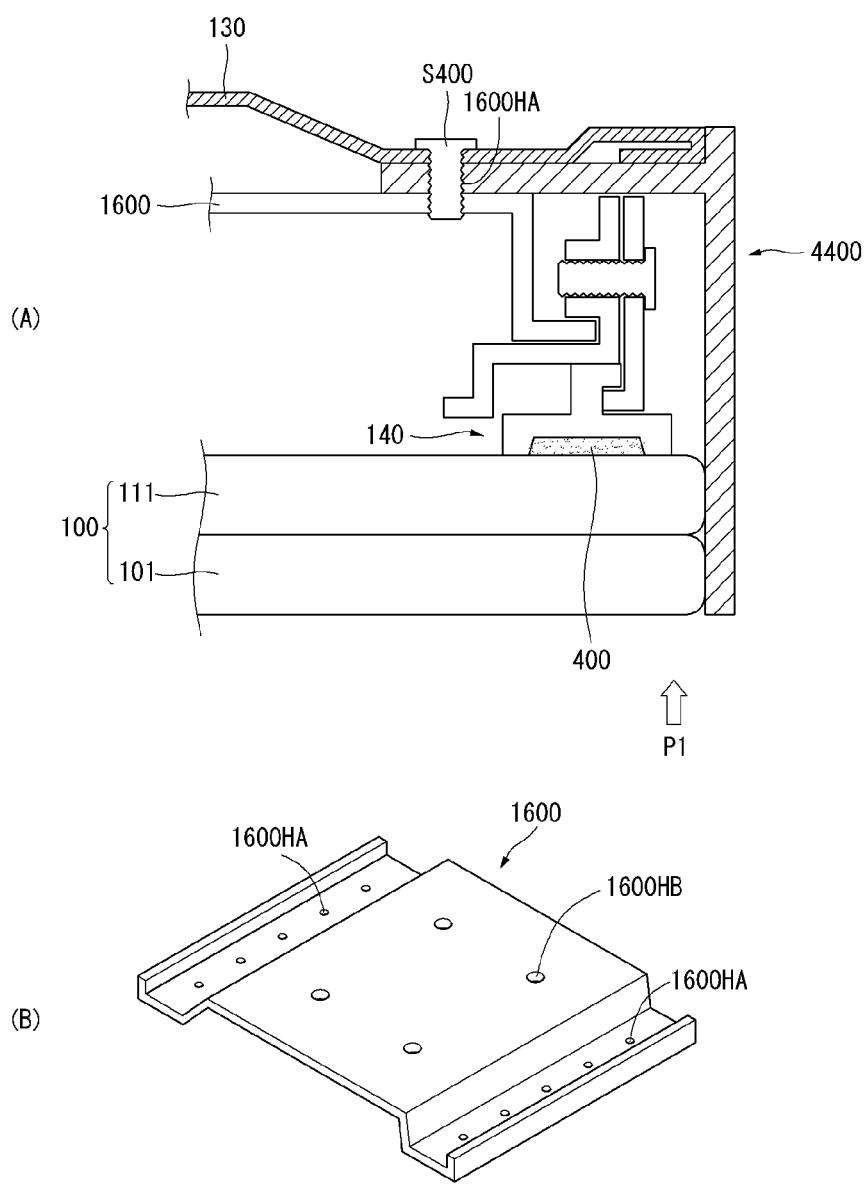

Alternatively, as shown in FIG. 12, the back cover 130, the side cover 4400, and the frame 1600 may be fastened to one another using a fastening member S400.

In this instance, each of the back cover 130, the side cover 4400, and the frame 1600 may include a hole through which the fastening member S400 may pass. The holes of the back cover 130, the side cover 4400, and the frame 1600 may be aligned with one another.

Hence, the back cover 130, the side cover 4400, and the frame 1600 may be electrically connected to one another using the fastening member S400. As a result, electromagnetic interference (EMI) may be reduced.

As shown in (B) of FIG. 12, the frame 1600 may have at least one hole. For example, the frame 1600 may have at least one first hole 1600HA and at least one second hole 1600HB.

As shown in (A) of FIG. 12, the first hole 1600HA may correspond to the fastening member S400 for fastening the frame 1600 to the back cover 130 and the side cover 4400. The second hole 1600HB may be used to fasten the frame 1600 to a predetermined structure, for example, the back cover 130 or may be used as a hole through which another structure passes.

FIGS. 13 to 45 illustrate in detail a configuration of the optical sheet part of the display device according to the embodiment of the invention. In the following description, the descriptions of the configuration and the structure described above are omitted. For example, the descriptions of the bracket, the auxiliary bracket, the connection frame, the frame, the side cover, the back cover, etc. are omitted.

Figure 13:
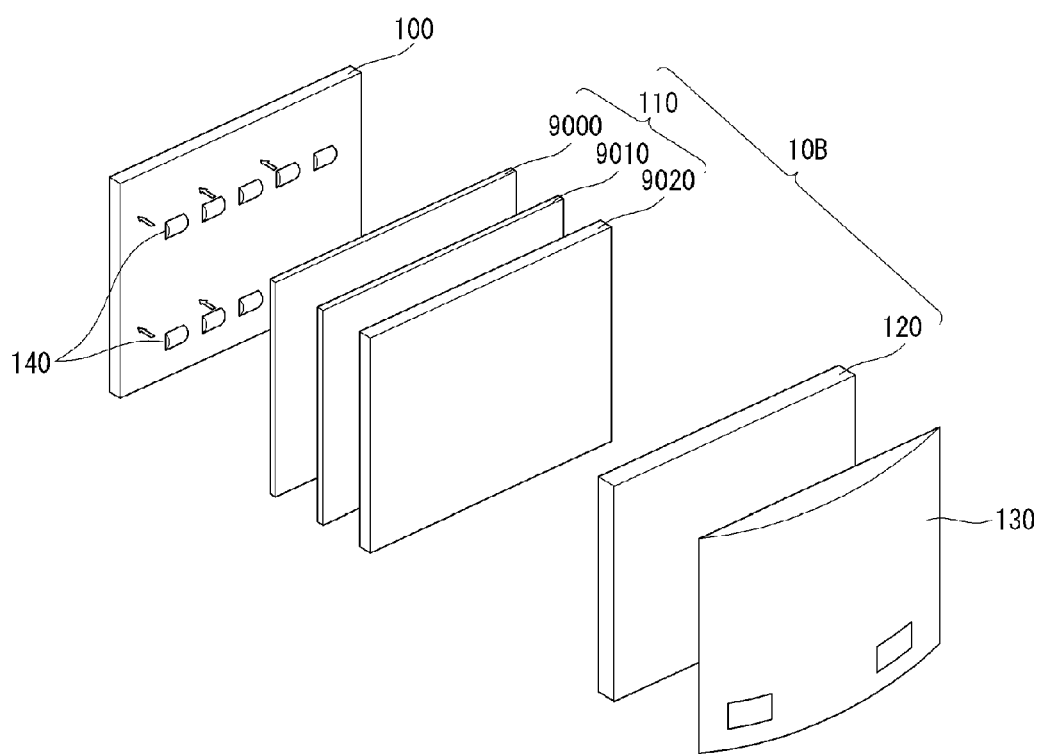
FIGS. 13 to 45 illustrate in detail a configuration of an optical sheet part of a display device according to an example embodiment of the invention.

As shown in FIG. 13, the backlight unit 10B including the optical sheet part 110 may be disposed between the display panel 100 and the back cover 130. The optical sheet part 110 may include a plurality of optical sheets. FIG. 13 shows the optical sheet part 110 including three optical sheets. Other numbers may be used for the optical sheet part 110.

Figure 14:
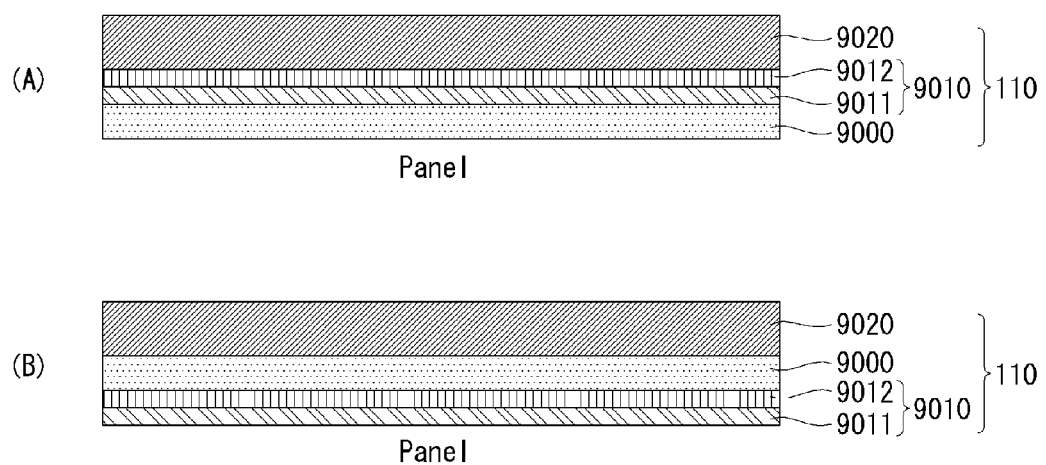

For example, as shown in (A) of FIG. 14, the optical sheet part 110 may include a reflective polarizer 9000, a diffusion plate 9020, and a prism sheet 9010 between the diffusion plate 9020 and the display panel 100. The diffusion plate 9020 may be positioned adjacent to the light source 120.

The diffusion plate 9020 diffuses light from the light source 120 and thus may prevent the light from being concentrated in a predetermined area. Because the light entering into the diffusion plate 9020 is scattered while passing through the diffusion plate 9020, the screen of the display panel 100 may be maintained at the uniform brightness.

The prism sheet 9010 may be positioned adjacent to the display panel 100.

The prism sheet 9010 may include a vertical prism sheet 9011 and a horizontal prism sheet 9012. FIG. 14 shows that the diffusion plate 9020 is positioned closer to the horizontal prism sheet 9012 than the vertical prism sheet 9011. However, disposition order of the vertical prism sheet 9011 and the horizontal prism sheet 9012 may be changed.

The prism sheet 9010 may adjust a travelling path of light entering into the prism sheet 9010 so that the light travels toward the display panel 100, thereby improving a luminance of the image displayed on the display panel 100.

The reflective polarizer 9000 may be referred to as a dual brightness enhancement film (DBEF). The reflective polarizer 9000 may selectively transmit or reflect light based on a wavelength of light. The reflective polarizer 9000 transmits light of a predetermined wavelength and reflects light of other wavelengths through these processes, thereby reducing an amount of light blocked by the polarizer of the display panel 100. Hence, the luminance of the image may be improved.

Since the reflective polarizer 9000, the diffusion plate 9020, and the prism sheet 9010 are known technologies, descriptions thereof may be briefly made or may be entirely omitted.

Alternatively, as shown in (B) of FIG. 14, disposition order of the reflective polarizer 9000 and the prism sheet 9010 may be changed. Namely, the prism sheet 9010 may be disposed between the reflective polarizer 9000 and the display panel 100.

In the embodiment of the invention, disposition order of the optical sheets constituting the optical sheet part 110 may be variously changed.

At least first optical sheet of the plurality of optical sheets constituting the optical sheet part 110 may include an opening, and at least second optical sheet of other optical sheets except the first optical sheet among the plurality of optical sheets may include a protrusion corresponding to the opening. In this instance, the first optical sheet and the second optical sheet may be coupled and fixed.

Figure 15:
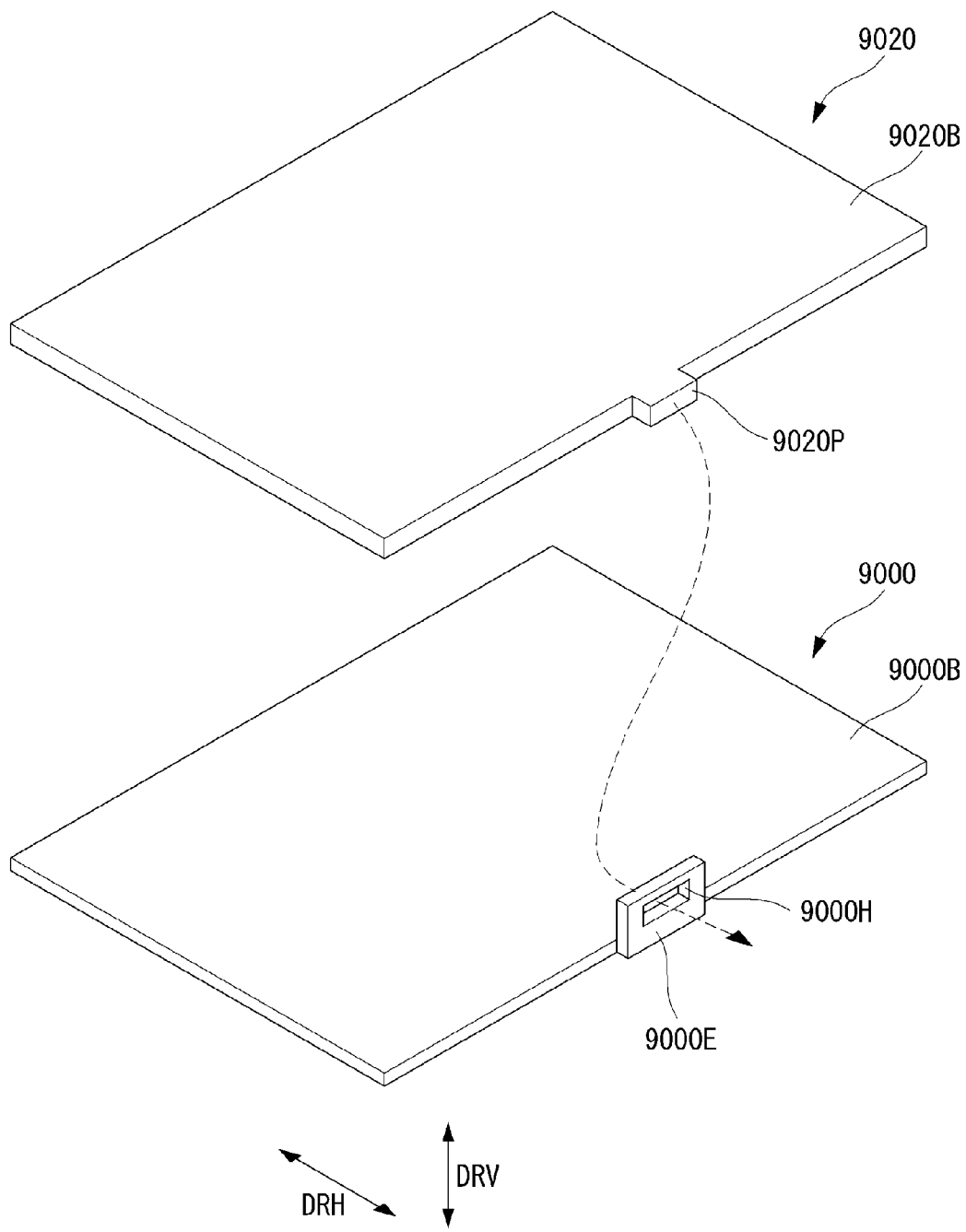

For example, as shown in FIG. 15, the diffusion plate 9020 of the optical sheet part 110 has a protrusion 9020P, and the reflective polarizer 9000 has an opening 9000H. In the embodiment of the invention, the reflective polarizer 9000 may correspond to the first optical sheet, and the diffusion plate 9020 may correspond to the second optical sheet.

More specifically, the reflective polarizer 9000 may include a body portion 9000B extending in a first direction (i.e., the horizontal direction) DRH and an extension portion 9000E extending from the body portion 9000B in a second direction (i.e., the vertical direction) DRV different from the first direction DRH. The first direction DRH and the second direction DRV may be perpendicular to each other.

The opening 9000H may be formed in the extension portion 9000E.

The diffusion plate 9020 may include a body portion 9020B extending in the first direction DRH and a protrusion 9020P extending from the body portion 9020B in the first direction DRH.

Figure 16:
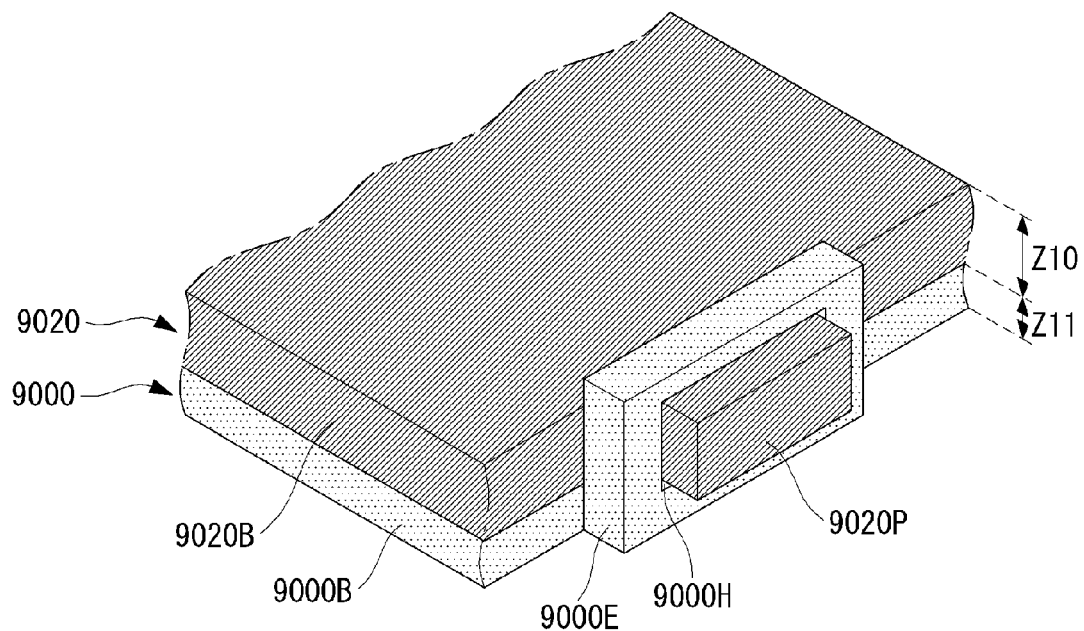

As shown in FIG. 16, the protrusion 9020P may pass through the opening 9000H.

Further, as shown in FIG. 16, a thickness Z10 of the diffusion plate 9020 having the protrusion 9020P may be greater than a thickness Z11 of the reflective polarizer 9000 having the extension portion 9000E and the opening 9000H. More specifically, the thickness Z10 of the body portion 9020B of the diffusion plate 9020 may be greater than the thickness Z11 of the body portion 9000B of the reflective polarizer 9000. This is because the extension portion and the opening of the sheet are easily formed when the sheet is thin.

Preferably, the optical sheet including the extension portion and the opening may have a minimum thickness among the plurality of optical sheets of the optical sheet part 110.

A third optical sheet between the first and second optical sheets in the plurality of optical sheets of the optical sheet part 110 may include a body portion extending in the first direction DRH, an extension portion extending from the body portion in the second direction DRV, and an opening formed in the extension portion.

Figure 17:
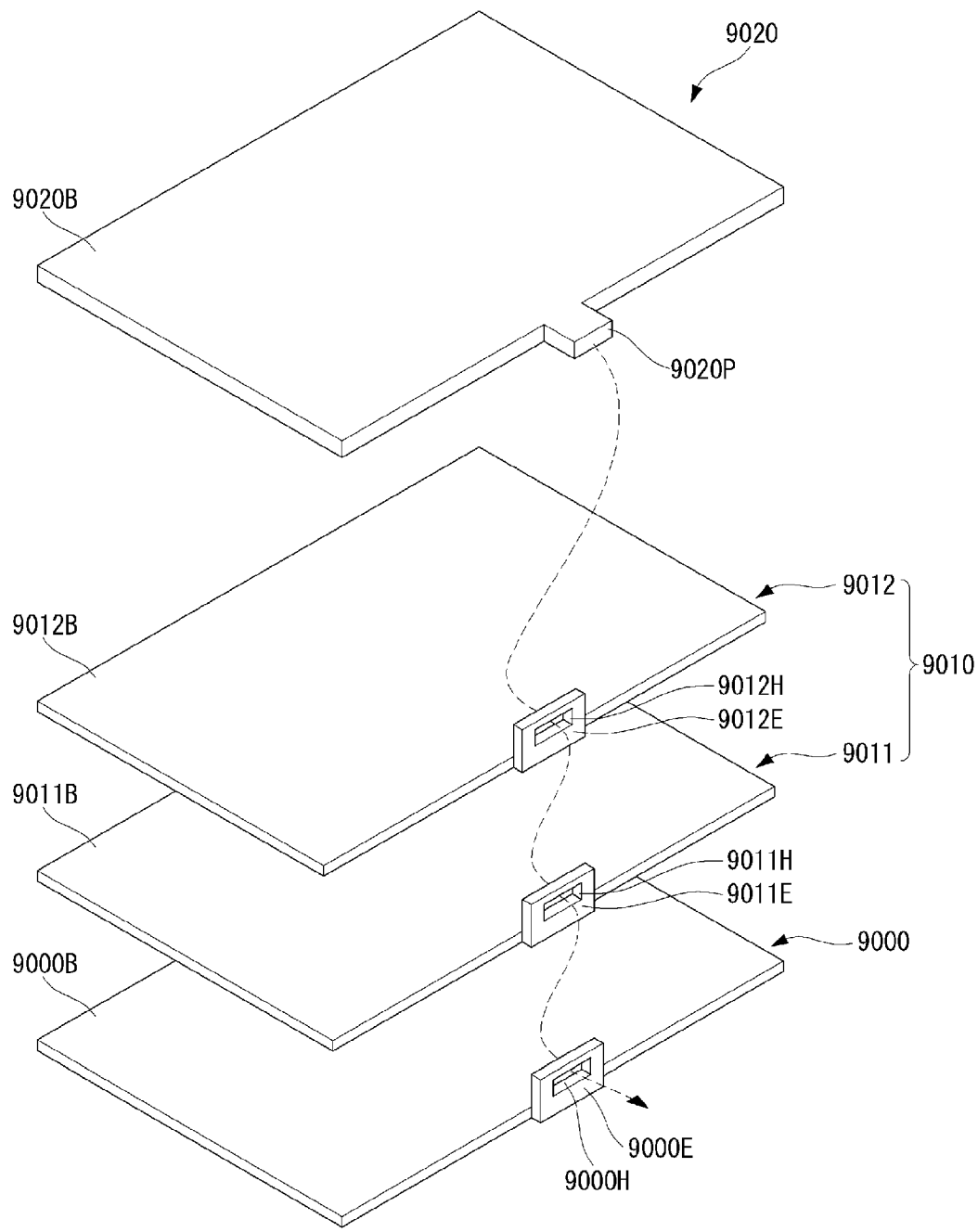

For example, as shown in FIG. 17, the diffusion plate 9020 of the optical sheet part 110 may include the protrusion 9020P. The vertical prism sheet 9011, the horizontal prism sheet 9012, and the reflective polarizer 9000 may respectively include body portions 9011B, 9012B, 9000B, extension portions 9011E, 9012E, 9000E, and openings 9011H, 9012H, 9000H. Since the configuration of the vertical prism sheet 9011 and the horizontal prism sheet 9012 was described above, a description thereof is omitted.

The vertical prism sheet 9011 and the horizontal prism sheet 9012 may correspond to the third optical sheet. In the embodiment of the invention, the vertical prism sheet 9011 and the horizontal prism sheet 9012 may be commonly referred to as the prism sheet 9010.

As shown in FIG. 17, the openings 9011H and 9012H of the prism sheet 9010 may overlap the opening 9000H of the reflective polarizer 9000.

Figure 18:
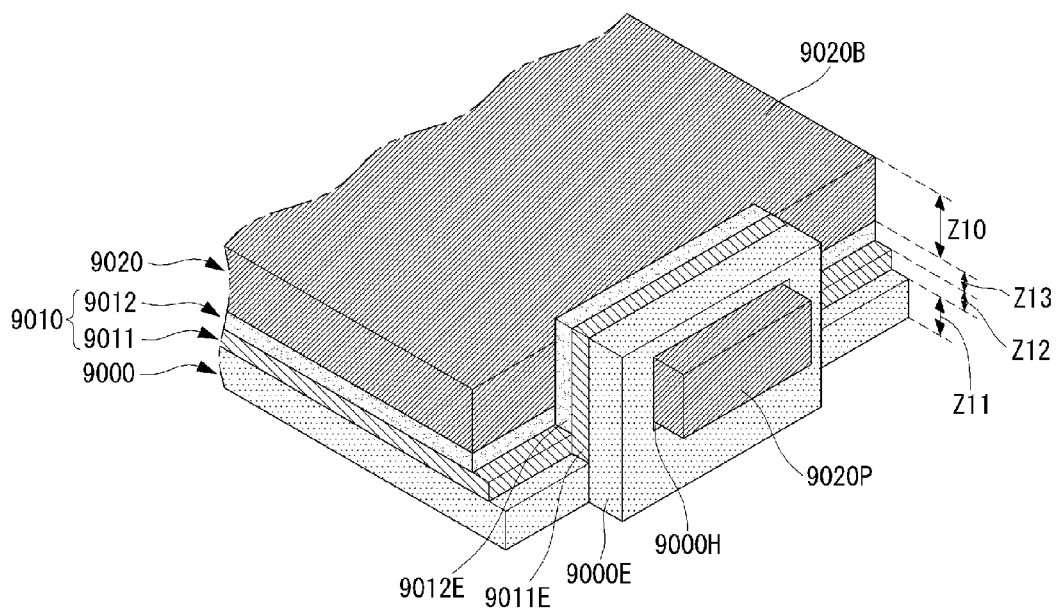

In this instance, as shown in FIG. 18, the protrusion 9020P of the diffusion plate 9020 may pass through the openings 9011H and 9012H of the prism sheet 9010 and the opening 9000H of the reflective polarizer 9000.

As shown in FIG. 18, the thickness Z10 of the diffusion plate 9020 may be greater than the thickness Z11 of the reflective polarizer 9000, a thickness Z12 of the vertical prism sheet 9011, and a thickness Z13 of the horizontal prism sheet 9012, considering that the extension portion and the opening of the sheet are easily formed when the sheet is thin. More specifically, the thickness Z10 of the body portion 9020B of the diffusion plate 9020 may be greater than the thickness Z11 of the body portion 9000B of the reflective polarizer 9000, the thickness Z12 of the body portion 9011B of the vertical prism sheet 9011, and the thickness Z13 of the body portion 9012B of the horizontal prism sheet 9012.

Figure 19:
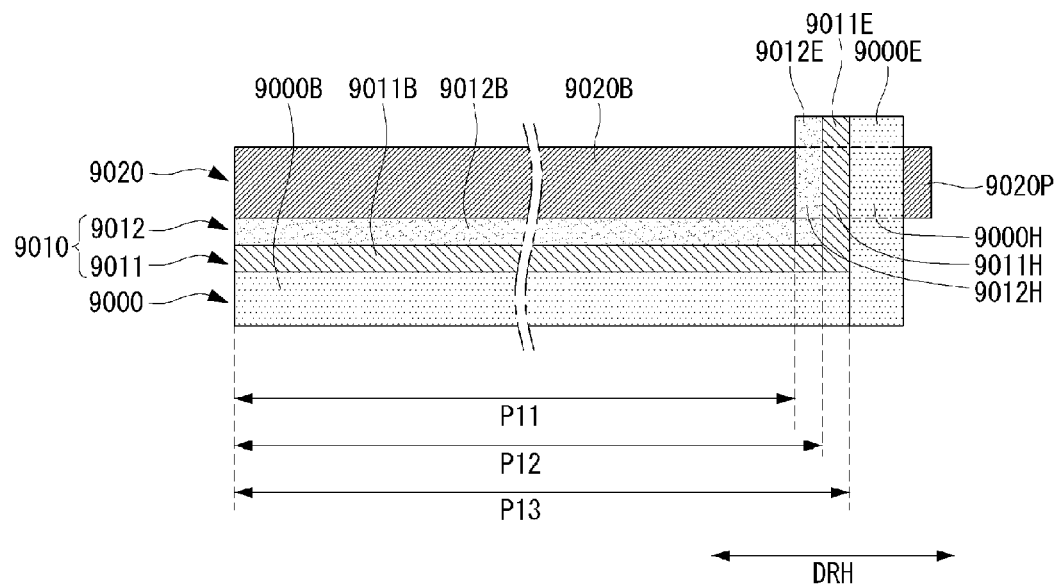

As shown in FIG. 19, when the openings 9000H, 9011H, and 9012H of the reflective polarizer 9000, the vertical prism sheet 9011, and the horizontal prism sheet 9012 overlap one another, a width P13 of the reflective polarizer 9000 in the first direction DRH may be greater than a width P12 of the vertical prism sheet 9011 in the first direction DRH, and the width P12 of the vertical prism sheet 9011 in the first direction DRH may be greater than a width P11 of the horizontal prism sheet 9012 in the first direction DRH because of the thicknesses of the extension portions 9000E, 9011E, and 9012E.

More specifically, the width P13 of the body portion 9000B of the reflective polarizer 9000 in the first direction DRH may be greater than the width P12 of the body portion 9011B of the vertical prism sheet 9011 in the first direction DRH, and the width P12 of the body portion 9011B of the vertical prism sheet 9011 in the first direction DRH may be greater than the width P11 of the body portion 9012B of the horizontal prism sheet 9012 in the first direction DRH.

The sizes of the openings of the optical sheets may vary based on the stack order of the plurality of optical sheets. For example, when the third optical sheet having the opening is positioned between the second optical sheet having the protrusion and the first optical sheet having the opening, the size of the opening of the first optical sheet may be equal to or greater than the size of the opening of the third optical sheet.

Figure 20:
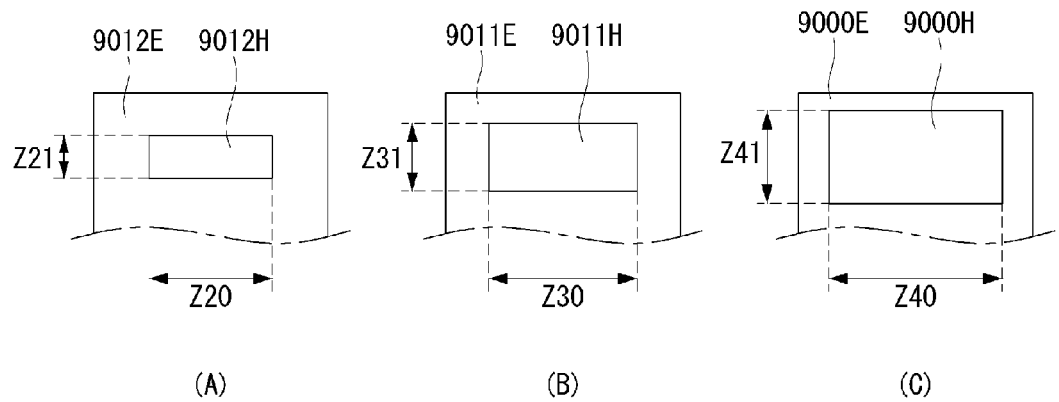

For example, as shown in (A), (B), and (C) of FIG. 20, a size Z40 of the opening 9000H of the reflective polarizer 9000 may be greater than a size Z30 of the opening 9011H of the vertical prism sheet 9011, and the size Z30 of the opening 9011H of the vertical prism sheet 9011 may be greater than a size Z20 of the opening 9012H of the horizontal prism sheet 9012.

In this instance, the protrusion 9020P of the diffusion plate 9020 may sequentially pass through the opening 9012H of the horizontal prism sheet 9012, the opening 9011H of the vertical prism sheet 9011, and the opening 9000H of the reflective polarizer 9000.

At least one hole may be formed between a body portion and an extension portion of at least one optical sheet. More specifically, at least one hole may be formed at a boundary of at least one body portion and at least one extension portion, and the body portion and the extension portion may be distinguished from each other by bending a formation portion of the hole.

Figure 21:
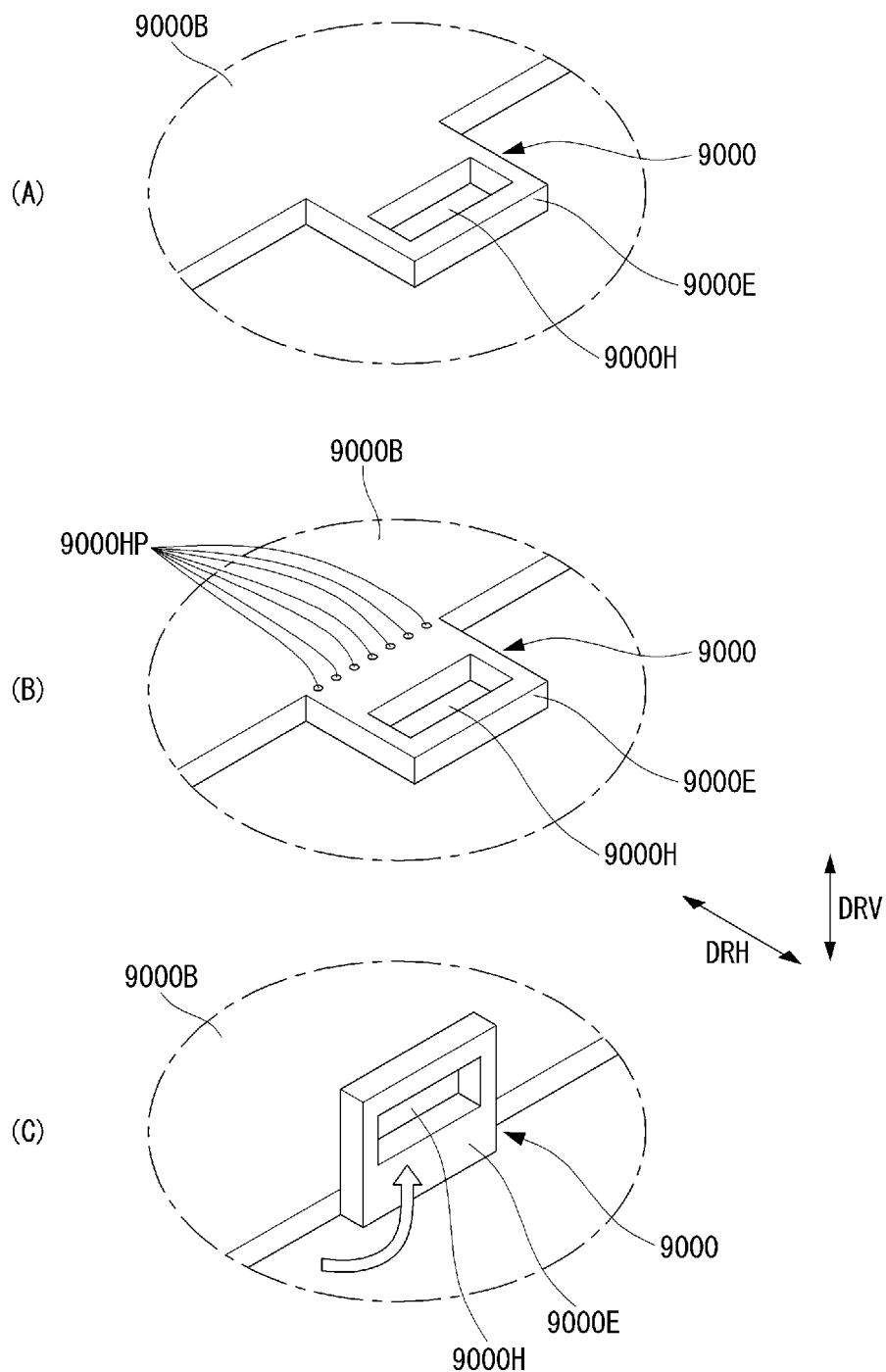

For example, as shown in (A) of FIG. 21, the reflective polarizer 9000 may include an extension portion 9000E extending from the body portion 9000B in the first direction DRH, and the opening 9000H may be formed in the extension portion 9000E.

Next, as shown in (B) of FIG. 21, a plurality of holes 9000HP may be formed at a boundary of the body portion 9000B and the extension portion 9000E.

Next, as shown in (C) of FIG. 21, the boundary of the body portion 9000B and the extension portion 9000E may be bent so that the extension portion 9000E extends from the body portion 9000B in the second direction DRV.

As above, at least one hole 9000HP between the body portion 9000B and the extension portion 9000E may help the extension portion 9000E to be bent.

An auxiliary extension portion may be formed between a body portion and an extension portion of at least one optical sheet. More specifically, the auxiliary extension portion may be formed between at least one hole, which is formed at a boundary of the body portion and the extension portion, and the body portion.

Figure 22:
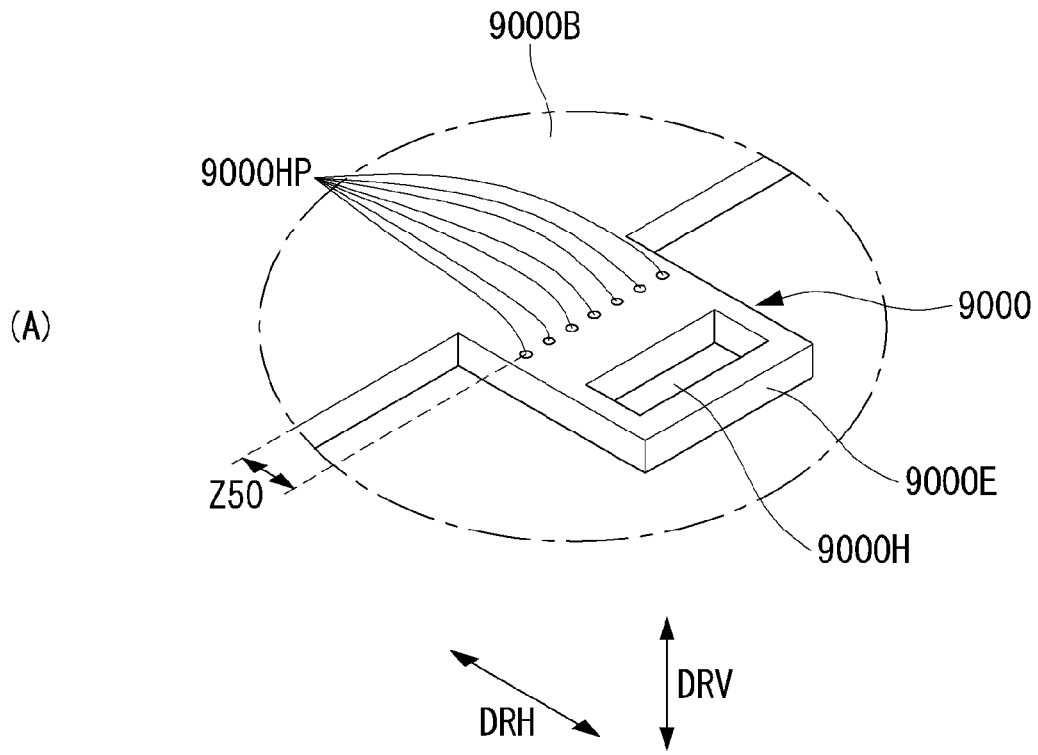
Figure 22:
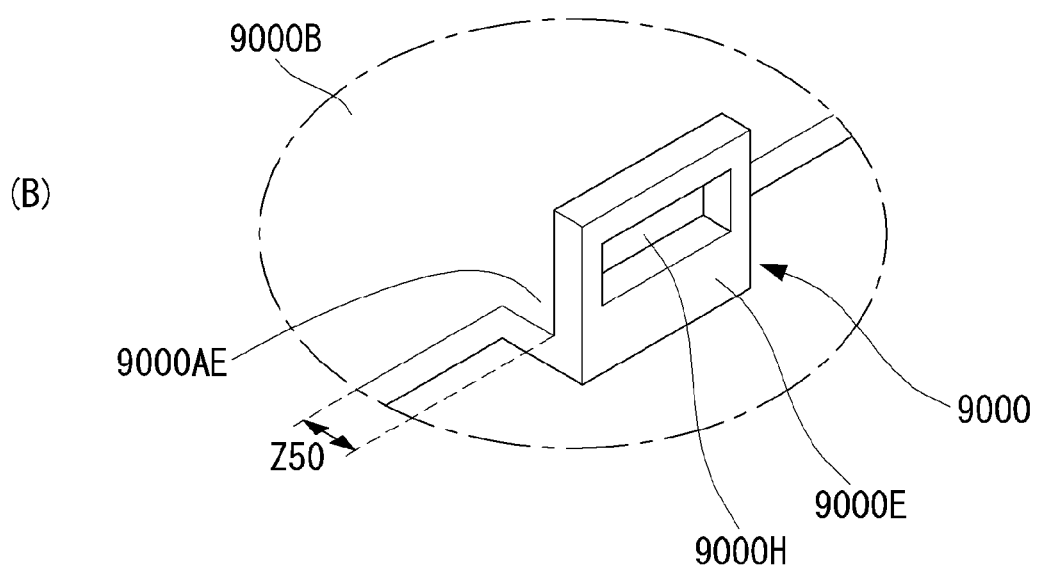

For example, as shown in (A) of FIG. 22, the reflective polarizer 9000 may include an extension portion 9000E extending from the body portion 9000B in the first direction DRH, and the opening 9000H may be formed in the extension portion 9000E.

Next, a plurality of holes 9000HP may be formed in the extension portion 9000E at a position, which is separated from the body portion 9000B by a predetermined distance Z50 in the first direction DRH.

Next, as shown in (B) of FIG. 22, when the extension portion 9000E is bent using the plurality of holes 9000HP, an auxiliary extension portion 9000AE may be formed between the body portion 9000B and the extension portion 9000E. In this instance, the body portion 9000B and the extension portion 9000E may be separated from each other by the predetermined distance Z50 in the first direction DRH.

A width of the auxiliary extension portion may vary based on the stack order of the plurality of optical sheets. For example, when the third optical sheet having the opening is positioned between the second optical sheet having the protrusion and the first optical sheet having the opening, a width of an auxiliary extension portion of the first optical sheet may be greater than a width of an auxiliary extension portion of the third optical sheet.

Figure 23:
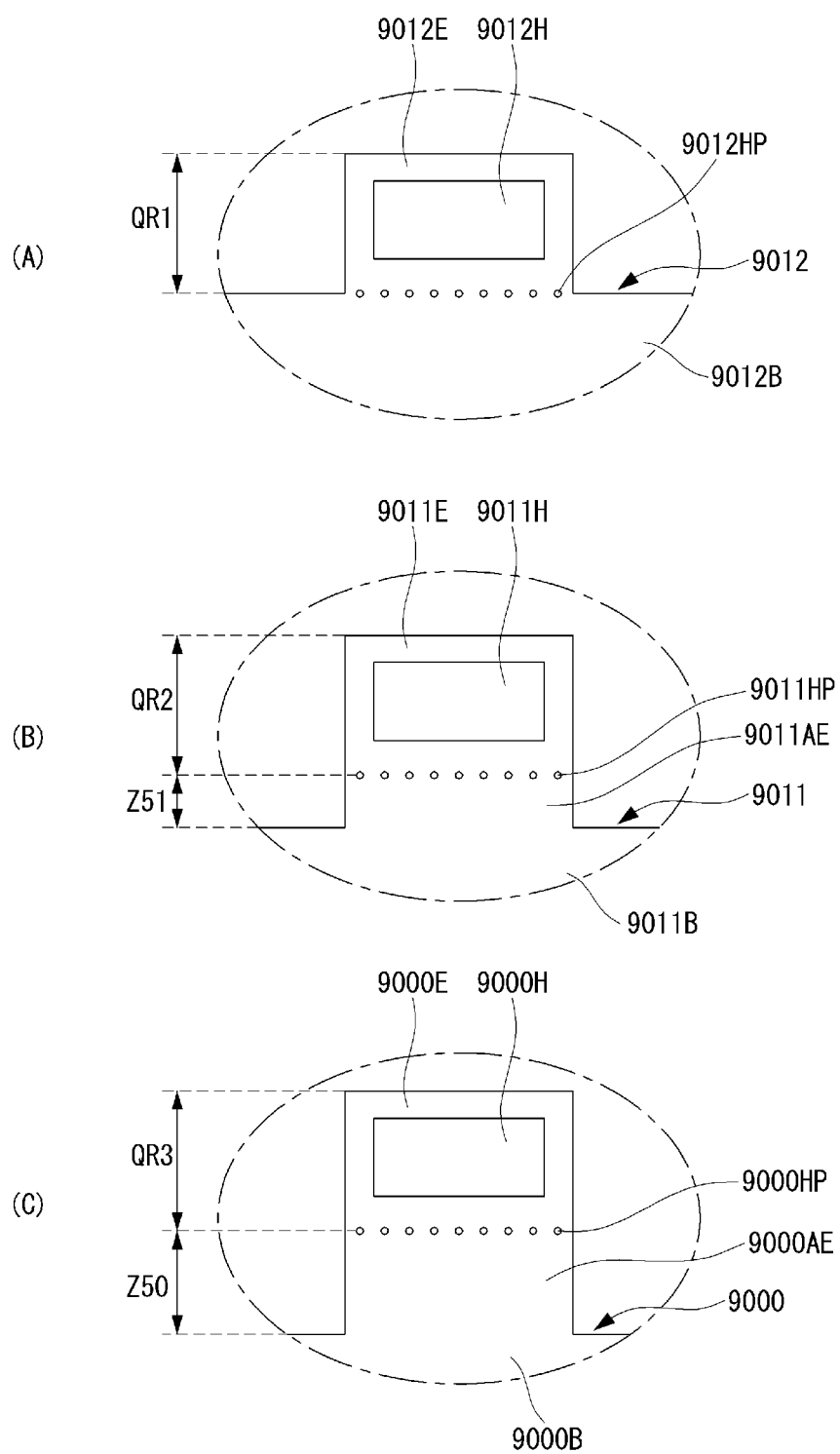

For example, as shown in (A), (B), and (C) of FIG. 23, a width Z50 of an auxiliary extension portion 9000AE of the reflective polarizer 9000 may be greater than a width Z51 of an auxiliary extension portion 9011AE of the vertical prism sheet 9011, and the width Z51 of the auxiliary extension portion 9011AE of the vertical prism sheet 9011 may be greater than a width of an auxiliary extension portion of the horizontal prism sheet 9012. In the embodiment of the invention, the auxiliary extension portion of the horizontal prism sheet 9012 may be omitted.

Further, as shown in (A), (B), and (C) of FIG. 23, a distance QR3 between the hole 9000HP and an end of the extension portion 9000E of the reflective polarizer 9000 may be greater than a distance QR2 between the hole 9011HP and an end of the extension portion 9011E of the vertical prism sheet 9011, and the distance QR2 may be greater than a distance QR1 between the hole 9012HP and an end of the extension portion 9012E of the horizontal prism sheet 9012.

Figure 24:
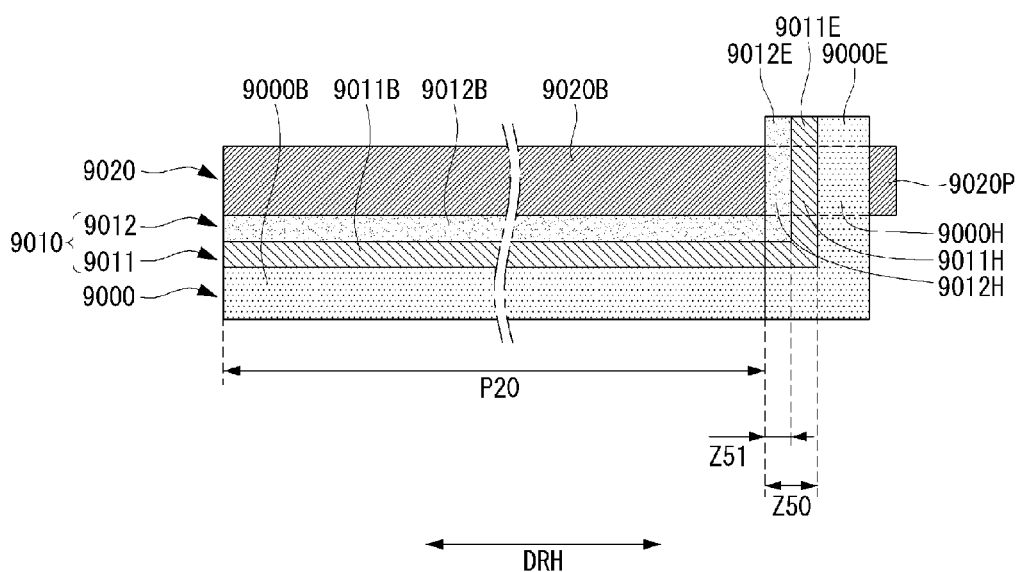

In this instance, as shown in FIG. 24, a width P20 of the reflective polarizer 9000, a width P20 of the vertical prism sheet 9011, and a width P20 of the horizontal prism sheet 9012 in the first direction DRH may be almost the same as one another.

More specifically, the width P20 of the body portion 9000B of the reflective polarizer 9000, the width P20 of the body portion 9011B of the vertical prism sheet 9011, and the width P20 of the body portion 9012B of the horizontal prism sheet 9012 in the first direction DRH may be almost the same as one another.

Figure 25:
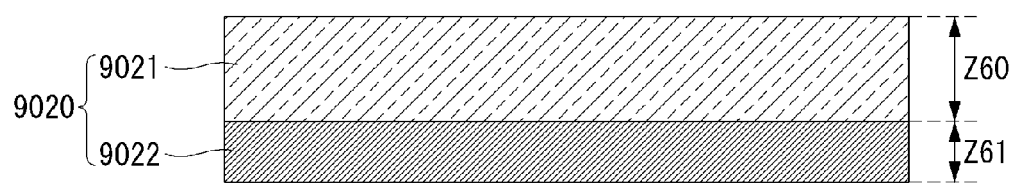

The diffusion plate 9020 may include a plurality of sheets. For example, as shown in FIG. 25, the diffusion plate 9020 may include a first diffusion plate 9021 and a second diffusion plate 9022. A thickness Z60 of the first diffusion plate 9021 may be different from a thickness Z61 of the second diffusion plate 9022. FIG. 25 shows that the thickness Z60 of the first diffusion plate 9021 is greater than the thickness Z61 of the second diffusion plate 9022. However, the thickness Z61 of the second diffusion plate 9022 may be greater than the thickness Z60 of the first diffusion plate 9021. Alternatively, the thickness Z60 of the first diffusion plate 9021 and the thickness Z61 of the second diffusion plate 9022 may be almost the same as each other.

Figure 26:
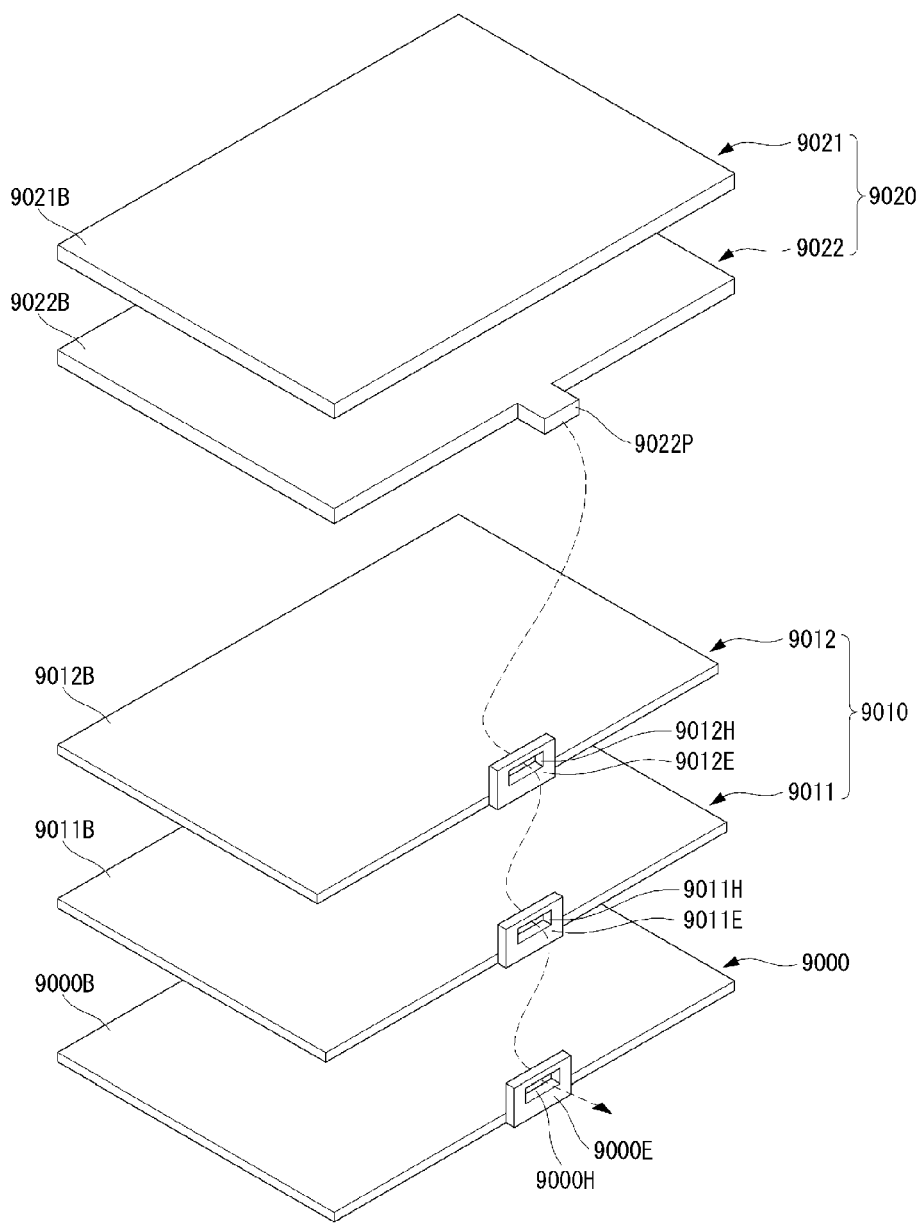

As shown in FIG. 26, the second diffusion plate 9022 may have a protrusion 9022P, and the first diffusion plate 9021 may not have a protrusion.

In this instance, the protrusion 9022P of the second diffusion plate 9022 may correspond to the openings 9011H and 9012H of the prism sheet 9010 and the opening 9000H of the reflective polarizer 9000.

Further, the first diffusion plate 9021 may be simply placed on the second diffusion plate 9022.

Figure 27:
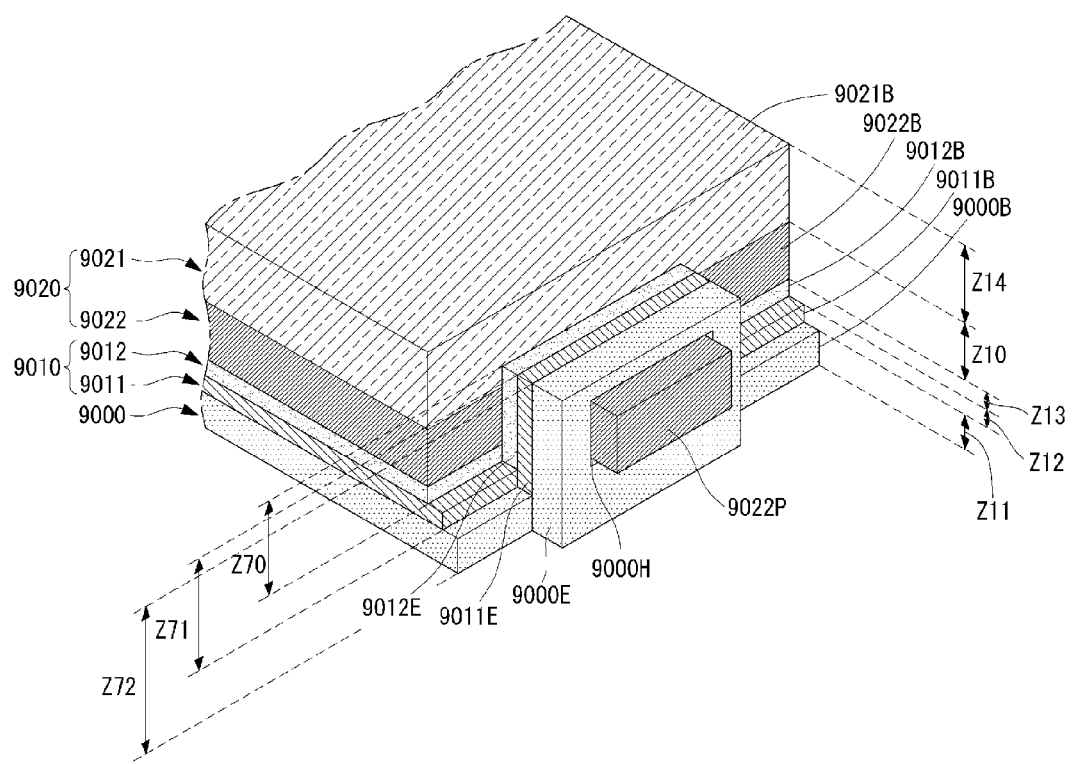

In this instance, the optical sheet part may have configuration illustrated in FIG. 27. A thickness Z14 of the first diffusion plate 9021 not having the protrusion may be greater than a thickness Z10 of the second diffusion plate 9022 having the protrusion 9022P for the ease of the protrusion formation process.

As shown in FIG. 27, an end of at least one of the extension portion 9000E of the reflective polarizer 9000, the extension portion 9011E of the vertical prism sheet 9011, and the extension portion 9012E of the horizontal prism sheet 9012 may be positioned on the side of the first diffusion plate 9021. In this instance, the detachment of the first diffusion plate 9021 may be prevented.

At least one of a length Z72 of the extension portion 9000E of the reflective polarizer 9000, a length Z71 of the extension portion 9011E of the vertical prism sheet 9011, and a length Z70 of the extension portion 9012E of the horizontal prism sheet 9012 may be greater than the thickness Z10 of the second diffusion plate 9022 and may be less than a sum (Z10+Z14) of the thickness Z14 of the first diffusion plate 9021 and the thickness Z10 of the second diffusion plate 9022, so that the end of at least one of the extension portion 9000E of the reflective polarizer 9000, the extension portion 9011E of the vertical prism sheet 9011, and the extension portion 9012E of the horizontal prism sheet 9012 is positioned on the side of the first diffusion plate 9021.

The configuration is described below in other manner.

It is assumed that first, third, second, and fourth optical sheets are sequentially disposed, the first optical sheet is positioned adjacent to the display panel 100, the fourth optical sheet is positioned adjacent to the back cover 130, the first and third optical sheets each include an extension portion and an opening, the second optical sheet includes a protrusion, and the fourth optical sheet does not include a protrusion.

In this instance, a thickness of the fourth optical sheet may be greater than thicknesses of the first, second, and third optical sheets.

In this instance, ends of the extension portions of the first and third optical sheets may be positioned on the side of the fourth optical sheet. At least one of lengths of the extension portions of the first and third optical sheets may be greater than a thickness of the second optical sheet and may be equal to or less than a sum of the thickness of the second optical sheet and a thickness of the fourth optical sheet.

In the embodiment disclosed herein, the first optical sheet may correspond to the reflective polarizer 9000, the third optical sheet may correspond to the prism sheet 9010, the second optical sheet may correspond to the second diffusion plate 9022, and the fourth optical sheet may correspond to the first diffusion plate 9021.

The protrusion of at least one optical sheet may be formed on a long side of the at least one optical sheet. In this instance, the extension portion and the opening may be formed on the long side of the at least one optical sheet.

Figure 28:
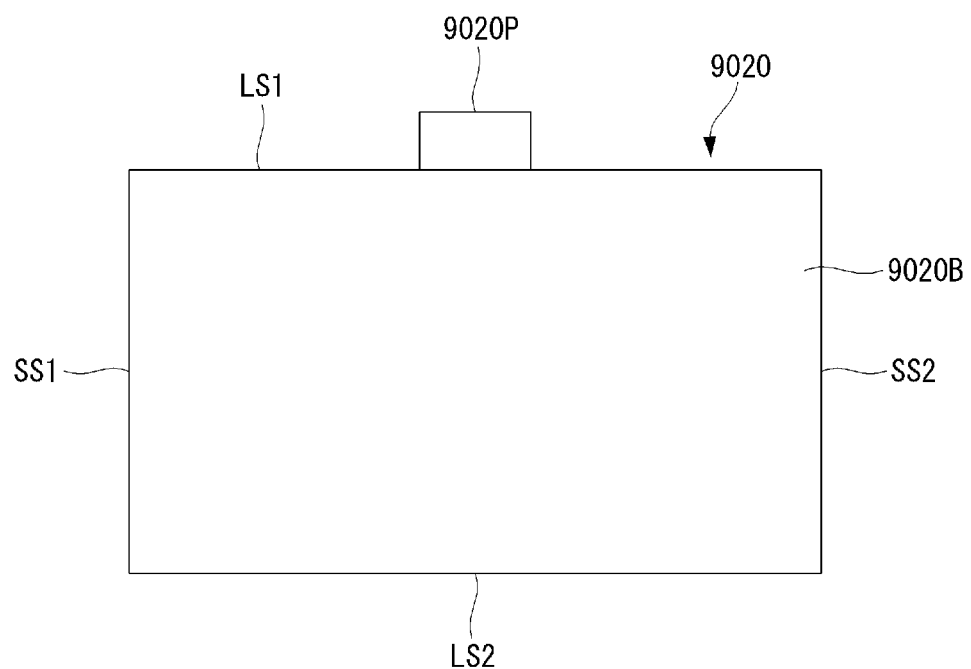

For example, as shown in FIG. 28, the body portion 9020B of the diffusion plate 9020 may include a first long side LS1, a second long side LS2 opposite the first long side LS1, a first short side SS1 adjacent to the first long side LS1 and the second long side LS2, and a second short side SS2 opposite the first short side SS1.

The protrusion 9020P may be formed on the first long side LS1 of the body portion 9020B of the diffusion plate 9020.

Alternatively, although not shown, a protrusion may be formed on a short side of at least one optical sheet. In this instance, an extension portion and an opening may be formed on the short side of the at least one optical sheet.

Alternatively, a protrusion (an extension portion and an opening) may be formed on both sides of the at least one optical sheet.

Figure 29:
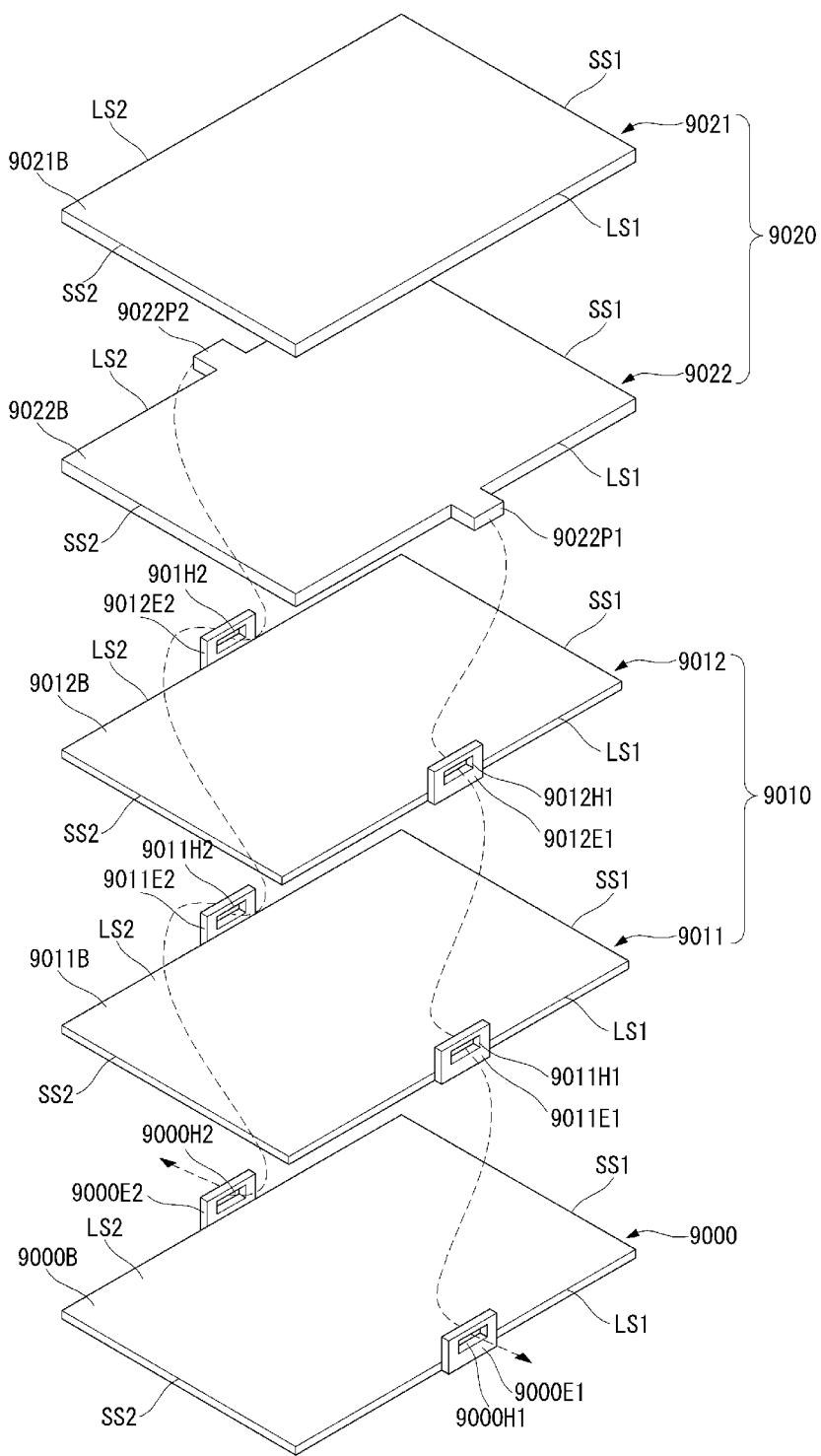

For example, as shown in FIG. 29, a first protrusion 9022P1 and a second protrusion 9022P2 may be formed on first and second long sides LS1 and LS2 of the body portion 9022B of the second diffusion plate 9022.

In this instance, extension portions 9000E1 and 9000E2 and openings 9000H1 and 9000H2 may be formed on first and second long sides LS1 and LS2 of the body portion 9000B of the reflective polarizer 9000. Further, extension portions 9011E1 and 9011E2 and openings 9011H1 and 9011H2 may be formed on first and second long sides LS1 and LS2 of the body portion 9011B of the vertical prism sheet 9011, and extension portions 9012E1 and 9012E2 and openings 9012H1 and 9012H2 may be formed on first and second long sides LS1 and LS2 of the body portion 9012B of the horizontal prism sheet 9012.

Alternatively, although not shown, the first protrusion 9022P1 and the second protrusion 9022P2 may be formed on first and second short sides SS1 and SS2 of the body portion 9022B of the second diffusion plate 9022.

Alternatively, a plurality of protrusions may be formed parallel to one another on at least one optical sheet. In this instance, a plurality of extension portions corresponding to the plurality of protrusions may be formed parallel to one another on the at least one optical sheet.

Figure 30:
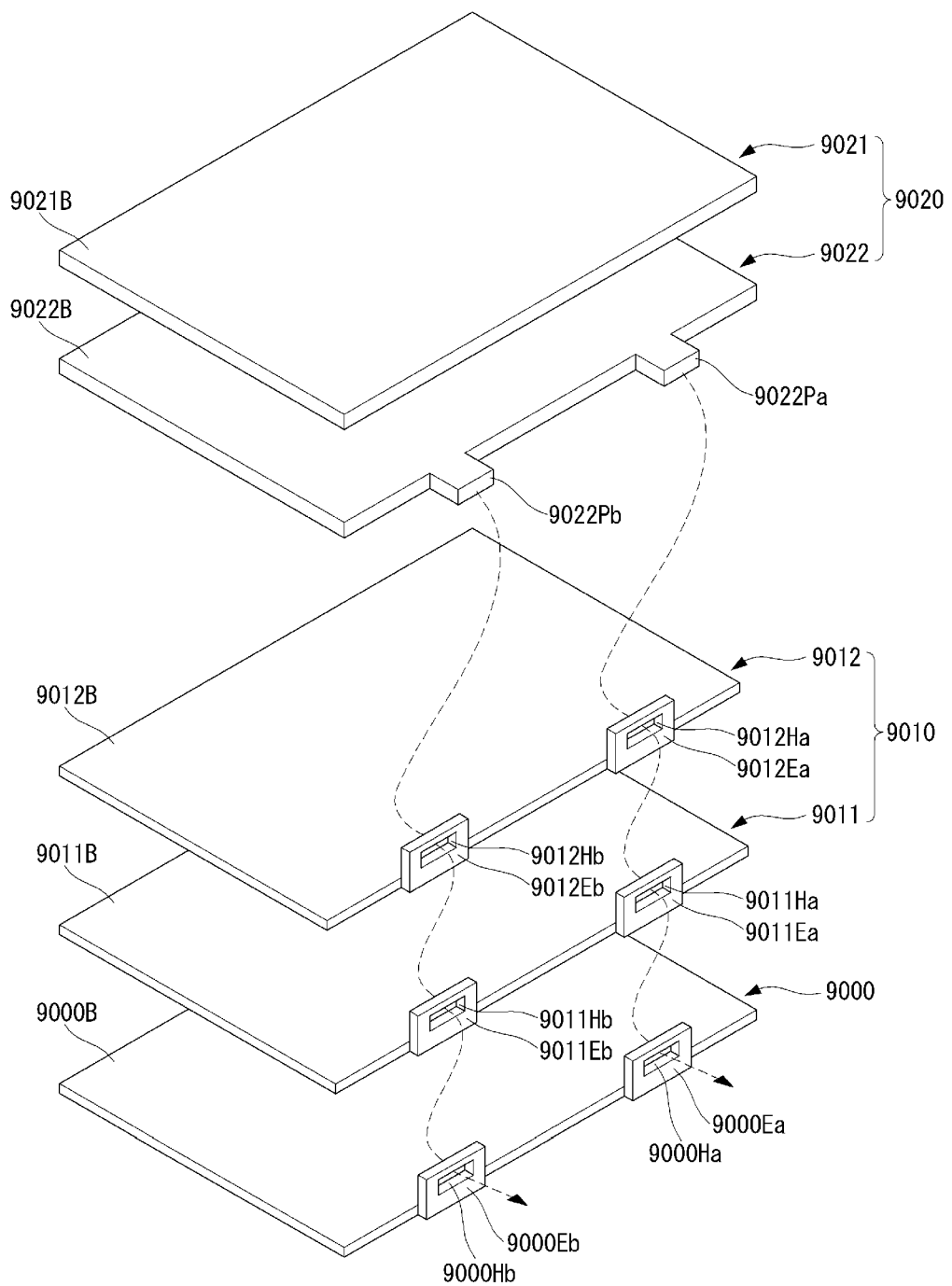

For example, as shown in FIG. 30, a first protrusion 9022Pa and a second protrusion 9022Pb may be formed parallel to each other on the first long side LS1 of the body portion 9022B of the second diffusion plate 9022.

In this instance, extension portions 9000Ea and 9000Eb and openings 9000Ha and 9000Hb may be formed parallel to each other on the first long side LS1 of the body portion 9000B of the reflective polarizer 9000. Further, extension portions 9011Ea and 9011Eb and openings 9011Ha and 901Hb may be formed parallel to each other on the first long side LS1 of the body portion 9011B of the vertical prism sheet 9011, and extension portions 9012Ea and 9012Eb and openings 9012Ha and 9012Hb may be formed parallel to each other on the first long side LS1 of the body portion 9012B of the horizontal prism sheet 9012.

Alternatively, although not shown, the first protrusion 9022Pa and the second protrusion 9022Pb may be formed on at least one of the second long side LS2, the first short side SS1, and the second short side SS2 of the body portion 9022B of the second diffusion plate 9022.

Alternatively, when first, third, and second optical sheets are sequentially disposed, the first optical sheet includes an extension portion and an opening, and the second optical sheet includes a protrusion, the third optical sheet between the first and second optical sheets may include a protrusion.

Figure 31:
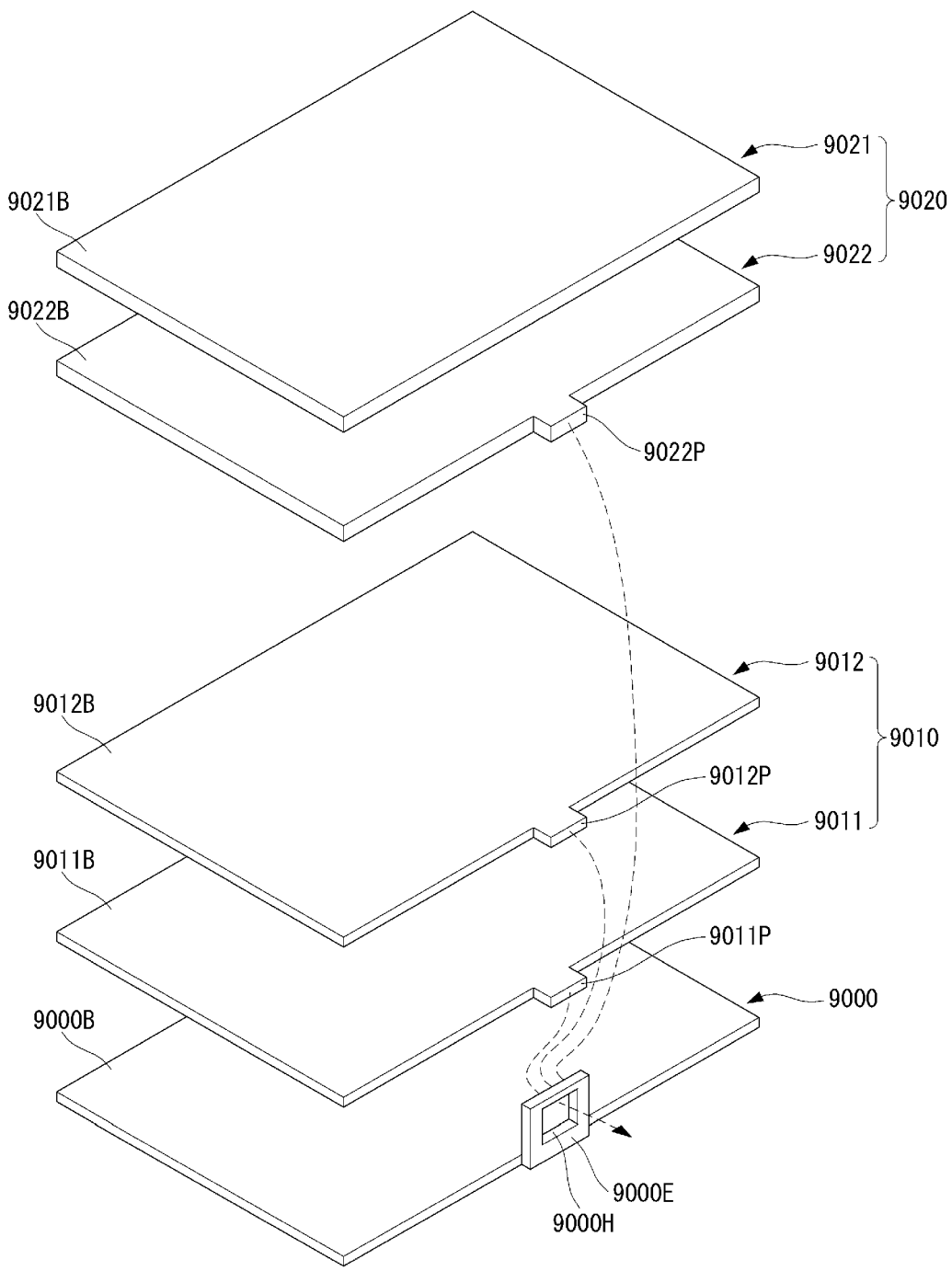

For example, as shown in FIG. 31, the vertical prism sheet 9011 and the horizontal prism sheet 9012 as well as the second diffusion plate 9022 may respectively include protrusions 9011P and 9012P.

Figure 32:
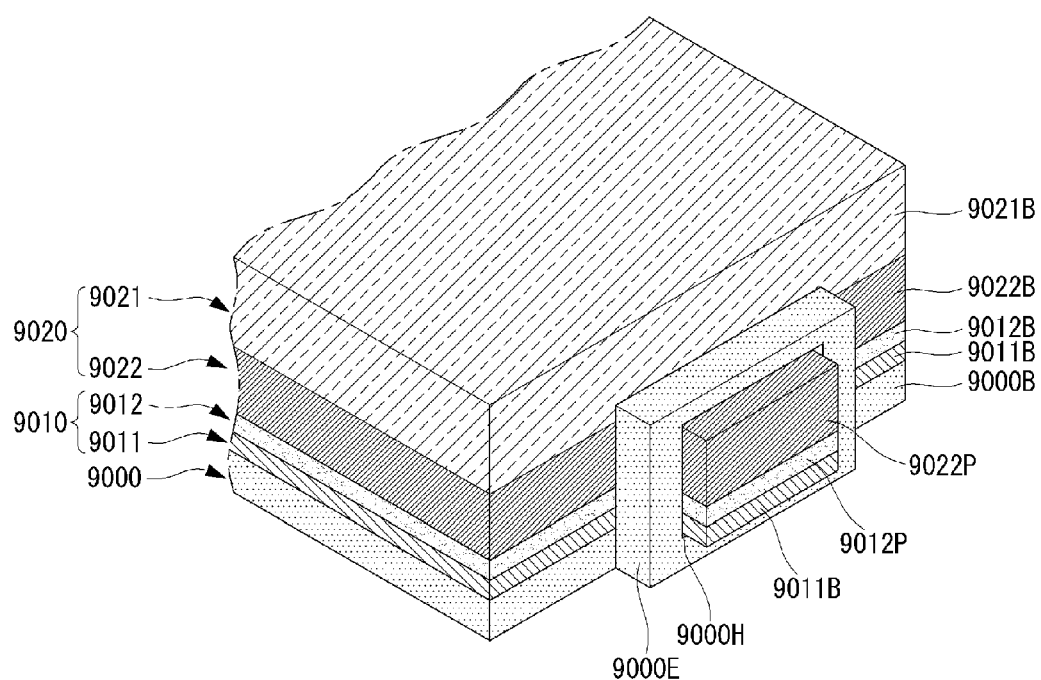

Further, as shown in FIG. 32, the protrusion 9022P of the second diffusion plate 9022, the protrusion 9011P of the vertical prism sheet 9011, and the protrusion 9012P of the horizontal prism sheet 9012 may pass through the opening 9000H of the reflective polarizer 9000.

Figure 33:
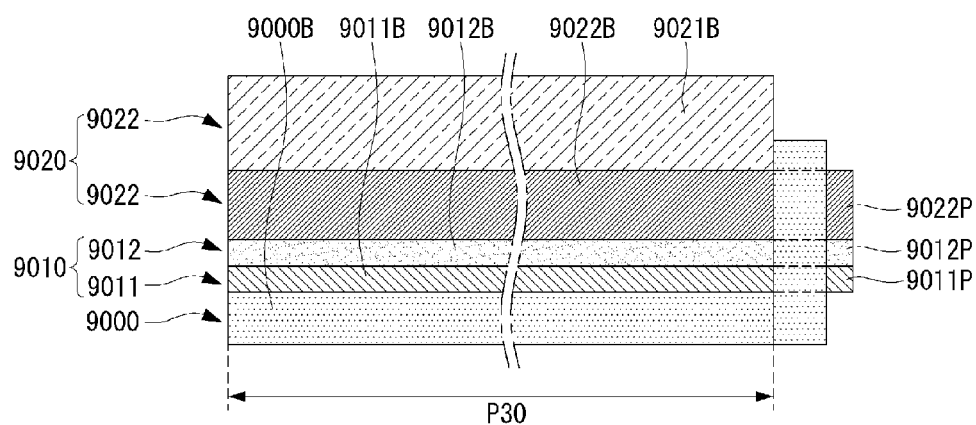

In this instance, as shown in FIG. 33, the body portion 9022B of the second diffusion plate 9022, the body portion 9011B of the vertical prism sheet 9011, and the body portion 9012B of the horizontal prism sheet 9012 may have almost the same length P30.

Figure 34:
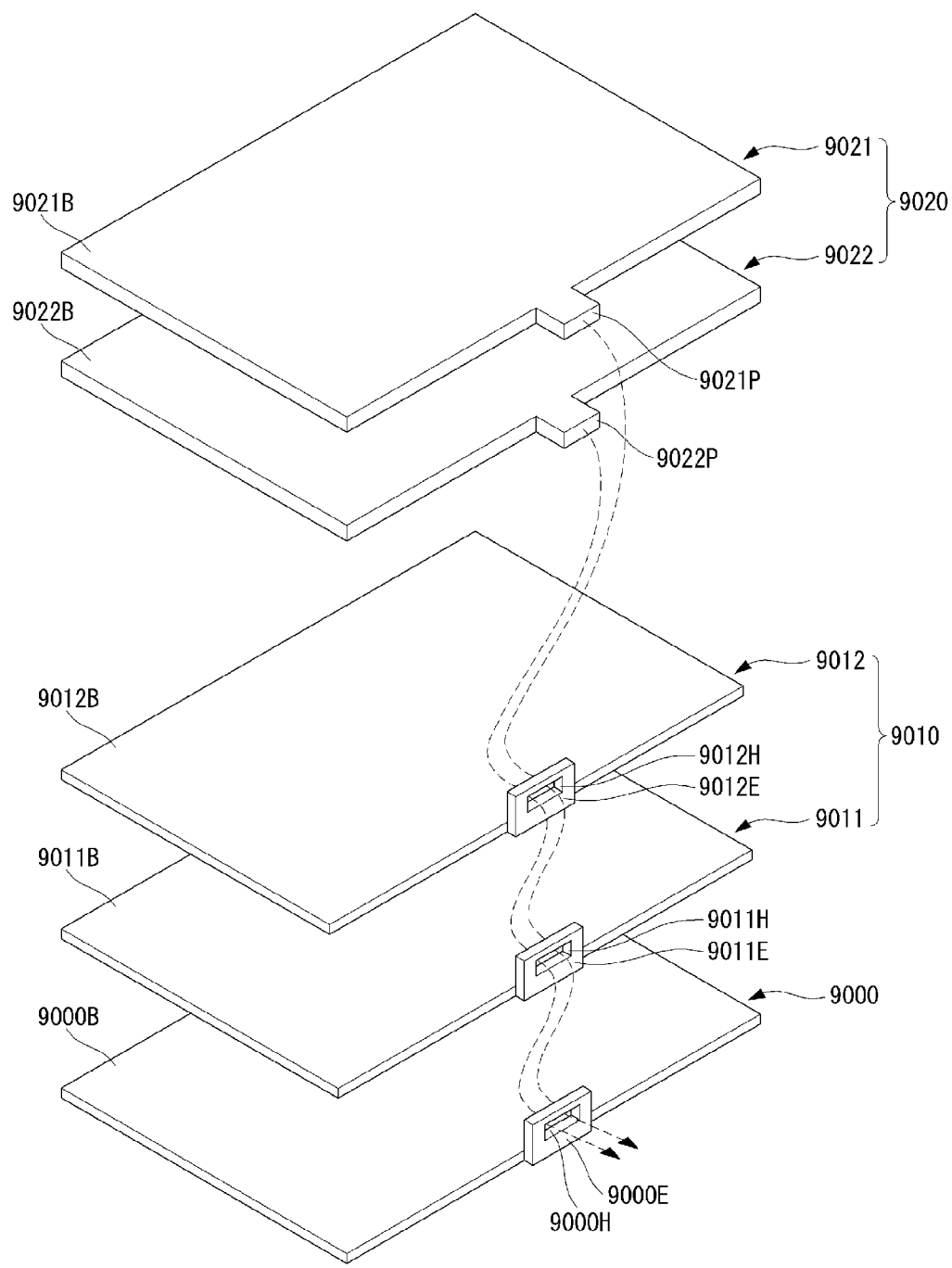

As shown in FIG. 34, the first diffusion plate 9021 may include a protrusion 9021P.

In this instance, the protrusion 9021P of the first diffusion plate 9021 and the protrusion 9022P of the second diffusion plate 9022 may pass through the opening 9011H of the vertical prism sheet 9011, the opening 9012H of the horizontal prism sheet 9012, and the opening 9000H of the reflective polarizer 9000.

Figure 35:
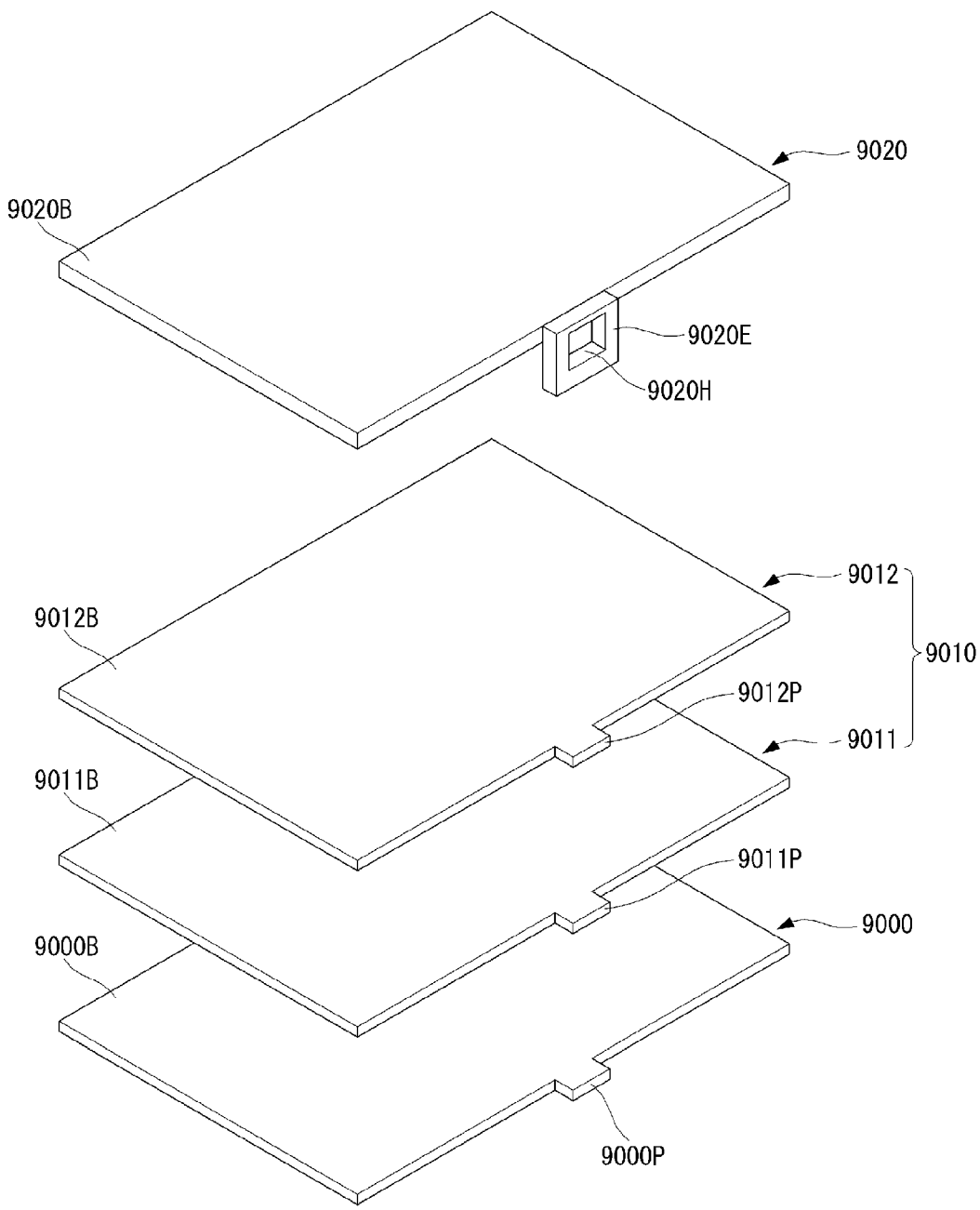

Alternatively, as shown in FIG. 35, the diffusion plate 9020 may include a body portion 9020B, an extension portion 9020E extending from the body portion 9020B, and an opening 9020H formed in the extension portion 9020E. Hereinafter, the embodiment of the invention is described on the assumption that the diffusion plate 9020 includes one sheet. However, the embodiment of the invention may be applied to the diffusion plate 9020 including the first and second diffusion plates 9021 and 9022.

The vertical prism sheet 9011, the horizontal prism sheet 9012, and the reflective polarizer 9000 may include protrusions 9011P, 9012P, and 9000P, respectively.

In this instance, the protrusions 9011P, 9012P, and 9000P of the vertical prism sheet 9011, the horizontal prism sheet 9012, and the reflective polarizer 9000 may pass through the opening 9020H of the diffusion plate 9020.

Alternatively, the prism sheet 9010 may include an extension portion and an opening, and the reflective polarizer 9000 and the diffusion plate 9020 may include a protrusion.

Figure 36:
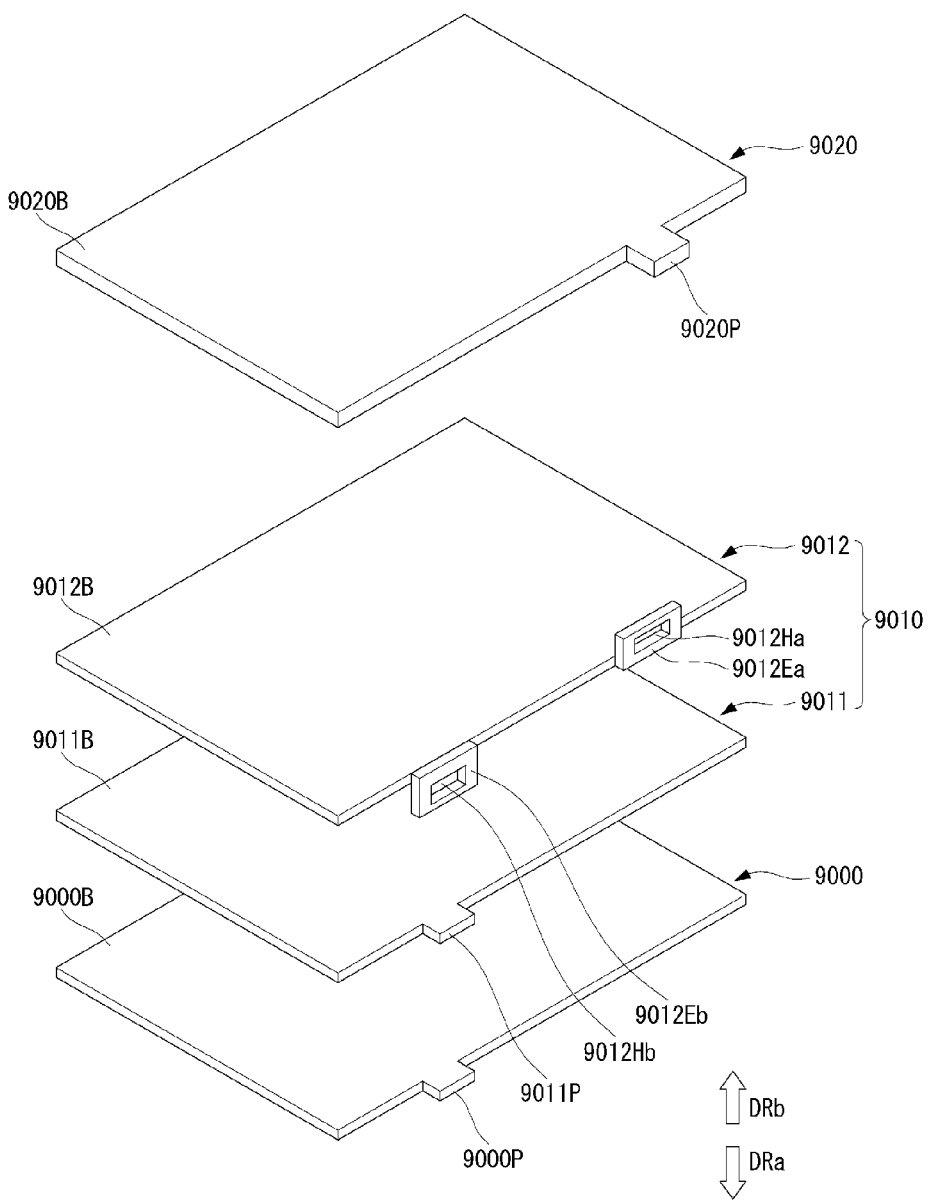

For example, as shown in FIG. 36, the horizontal prism sheet 9012 may include a first extension portion 9012Ea extending in a direction DRb traveling to the diffusion plate 9020 (or the back cover 130) and a second extension portion 9012Eb extending in a direction DRa traveling to the reflective polarizer 9000 (or the display panel 100). A first opening 9012Ha may be formed in the first extension portion 9012Ea, and a second opening 9012Hb may be formed in the second extension portion 9012Eb.

A protrusion 9020P of the diffusion plate 9020 may correspond to the first opening 9012Ha of the horizontal prism sheet 9012, and a protrusion 9000P of the reflective polarizer 9000 and a protrusion 9011P of the vertical prism sheet 9011 may correspond to the second opening 9012Hb of the horizontal prism sheet 9012.

At least one optical sheet may include a hook.

Figure 37:
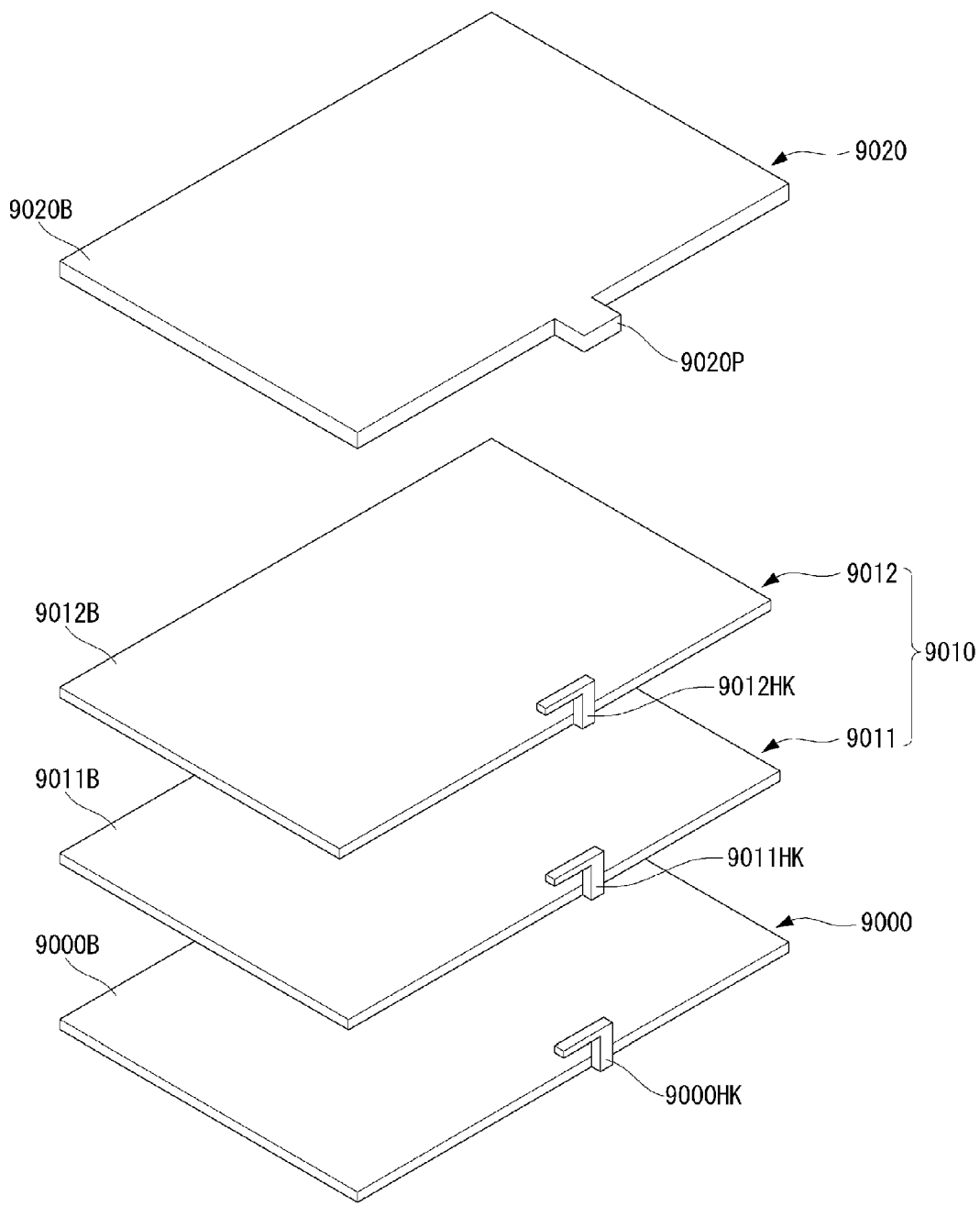

For example, as shown in FIG. 37, the diffusion plate 9020 may include a protrusion 9020P, and the horizontal prism sheet 9012, the vertical prism sheet 9011, and the reflective polarizer 9000 may respectively include hooks 9012HK, 9011HK, and 9000HK.

Figure 38:
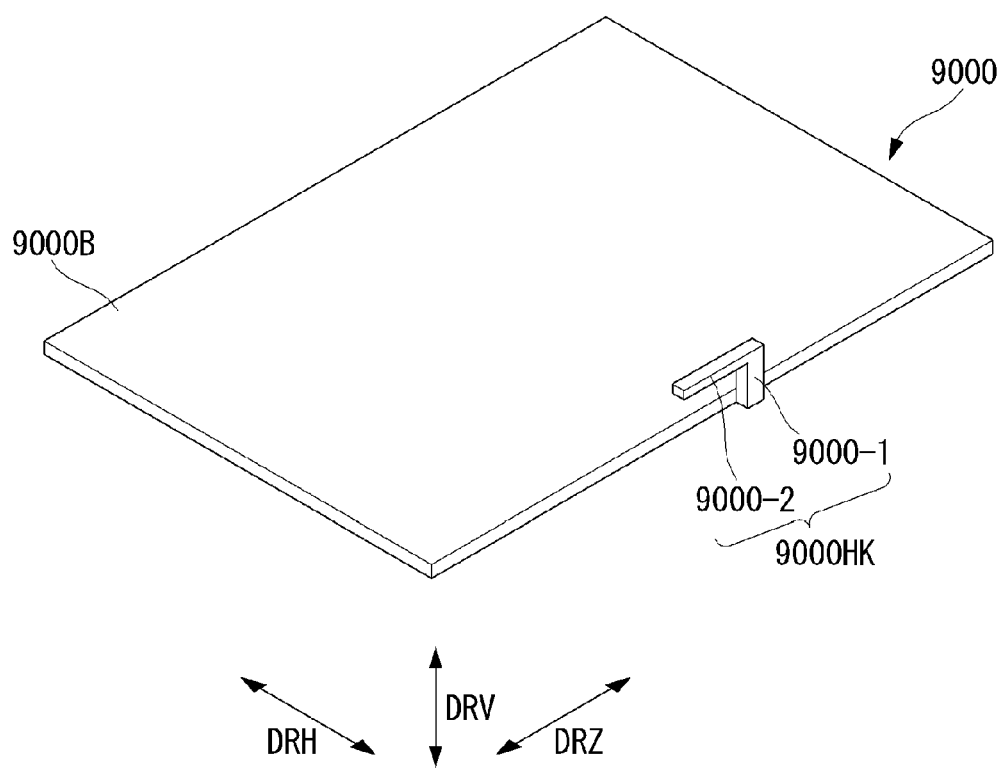

Among the hooks 9012HK, 9011HK, and 9000HK, the hook 9000HK of the reflective polarizer 9000 is described as an example with reference to FIG. 38.

As shown in FIG. 38, the reflective polarizer 9000 may include a body portion 9000B extending in the first direction DRH and the hook 9000HK formed in the body portion 9000B. The hook 9000HK may include a first portion 9000-1 extending from the body portion 9000B in the second direction DRV and a second portion 9000-2 extending from an end of the first portion 9000-1 in a third direction DRZ crossing the first and second directions DRH and DRV.

Figure 39:
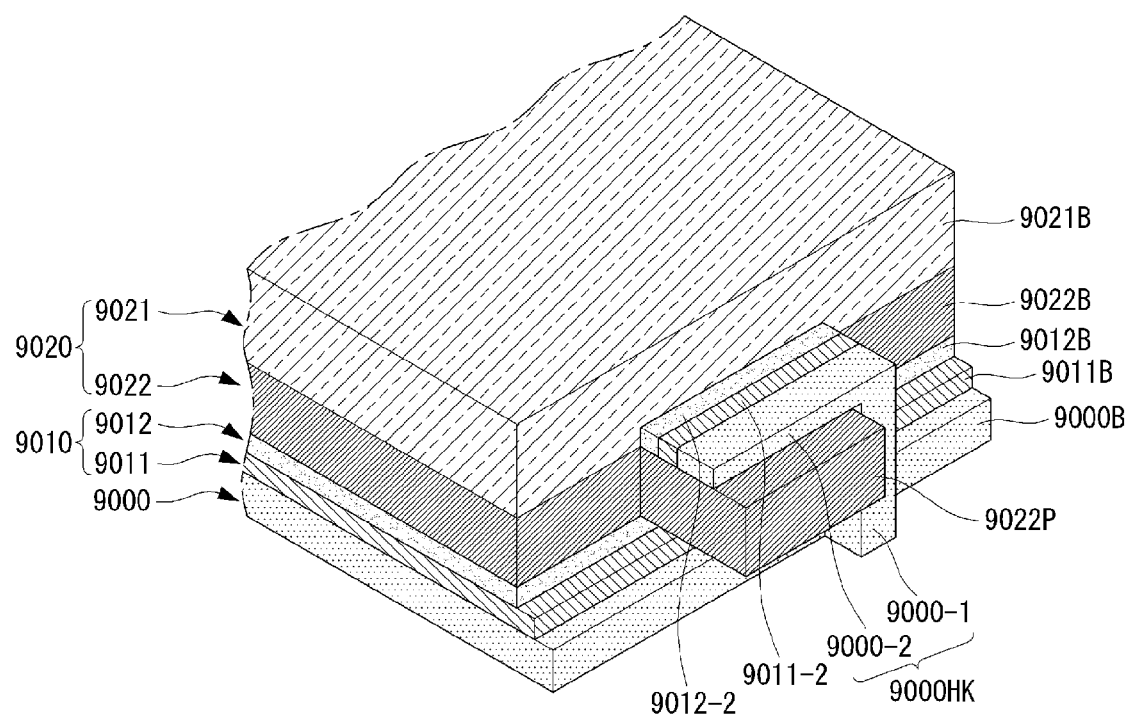

As shown in FIG. 39, the hooks 9012HK, 9011HK, and 9000HK may be hung on the protrusion 9022P of the diffusion plate 9020, for example, the second diffusion plate 9022.

A body portion of at least one optical sheet may have a hole, and at least one optical sheet may include a protrusion corresponding to the hole of the body portion.

Figure 40:
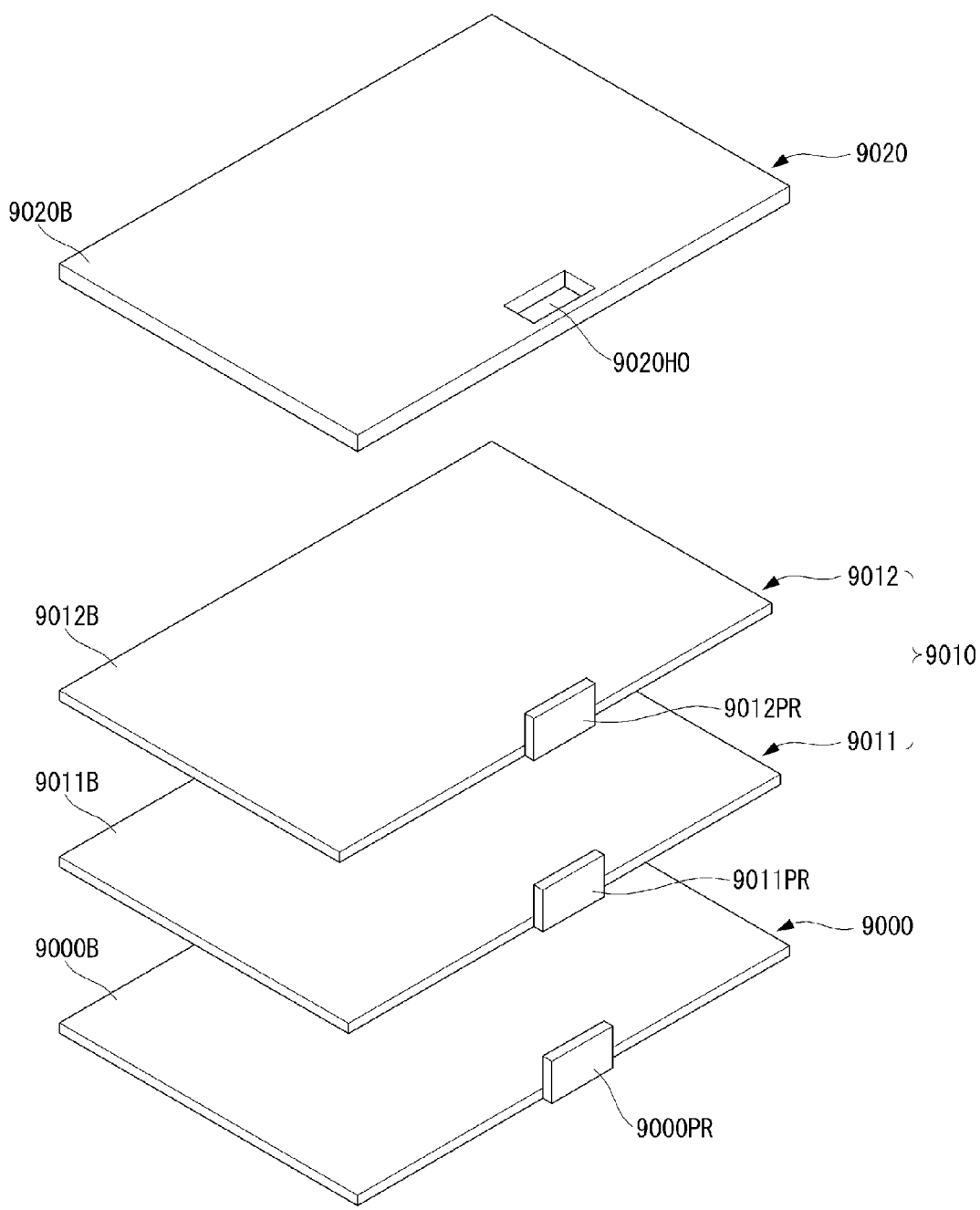

For example, as shown in FIG. 40, a body portion 9020B of the diffusion plate 9020 may have a hole 9020HO. The horizontal prism sheet 9012, the vertical prism sheet 9011, and the reflective polarizer 9000 may respectively include protrusions 9012PR, 9011PR, and 9000PR corresponding to the hole 9020HO of the diffusion plate 9020.

The protrusions 9012PR, 9011PR, and 9000PR may extend form the body portions 9012B, 9011B, and 9000B of the horizontal prism sheet 9012, the vertical prism sheet 9011, and the reflective polarizer 9000 in the second direction DRV, respectively.

Figure 41:
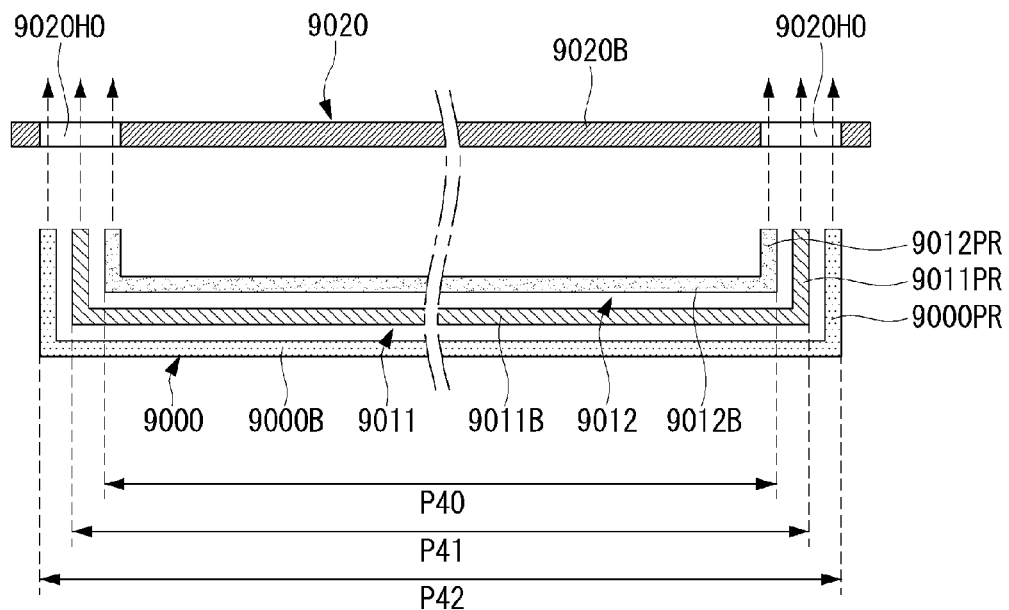

As shown in FIG. 41, protrusions 9012PR, 9011PR, and 9000PR of the horizontal prism sheet 9012, the vertical prism sheet 9011, and the reflective polarizer 9000 may pass through a hole 9020HO of the diffusion plate 9020.

In this instance, a length P40 of the body portion 9012B of the horizontal prism sheet 9012 may be less than a length P41 of the body portion 9011B of the vertical prism sheet 9011. The length P41 of the body portion 9011B of the vertical prism sheet 9011 may be less than a length P42 of the body portion 9000B of the reflective polarizer 9000.

Figure 42:
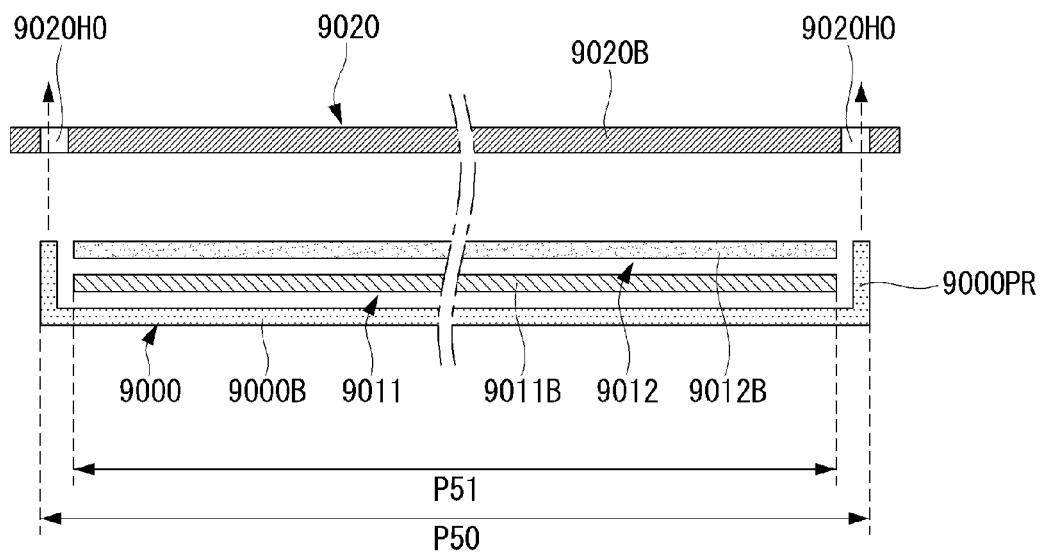

Alternatively, as shown in FIG. 42, the body portion 9020B of the diffusion plate 9020 may have a hole 9020HO, and the reflective polarizer 9000 may include a protrusion 9000PR corresponding to the hole 9020HO of the diffusion plate 9020. Further, the horizontal prism sheet 9012 and the vertical prism sheet 9011 may not include a protrusion.

In this instance, the protrusion 9000PR of the reflective polarizer 9000 may pass through the hole 9020HO of the diffusion plate 9020, and thus the reflective polarizer 9000 may be coupled with the diffusion plate 9020. Further, the horizontal prism sheet 9012 and the vertical prism sheet 9011 between the reflective polarizer 9000 and the diffusion plate 9020 may be surrounded and supported by the reflective polarizer 9000 and the diffusion plate 9020.

A body portion of at least one optical sheet may have a groove, and at least one optical sheet may include a protrusion corresponding to the groove of the body portion.

Figure 43:
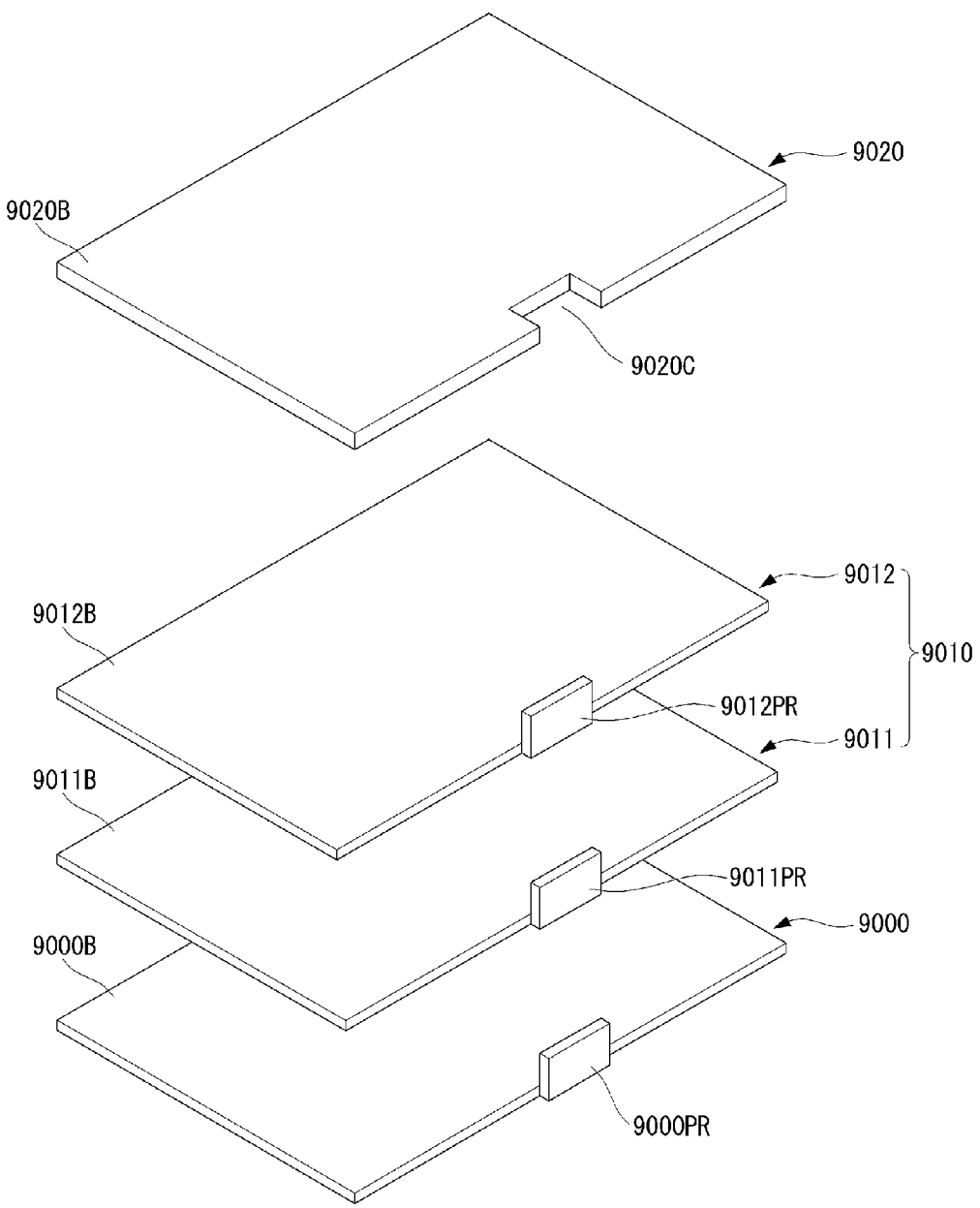

For example, as shown in FIG. 43, a body portion 9020B of the diffusion plate 9020 may have a groove 9020C. The horizontal prism sheet 9012, the vertical prism sheet 9011, and the reflective polarizer 9000 may respectively include protrusions 9012PR, 9011PR, and 9000PR corresponding to the groove 9020C of the diffusion plate 9020.

The protrusions 9012PR, 9011PR, and 9000PR of the horizontal prism sheet 9012, the vertical prism sheet 9011, and the reflective polarizer 9000 may correspond to the groove 9020C of the diffusion plate 9020.

Figure 44:
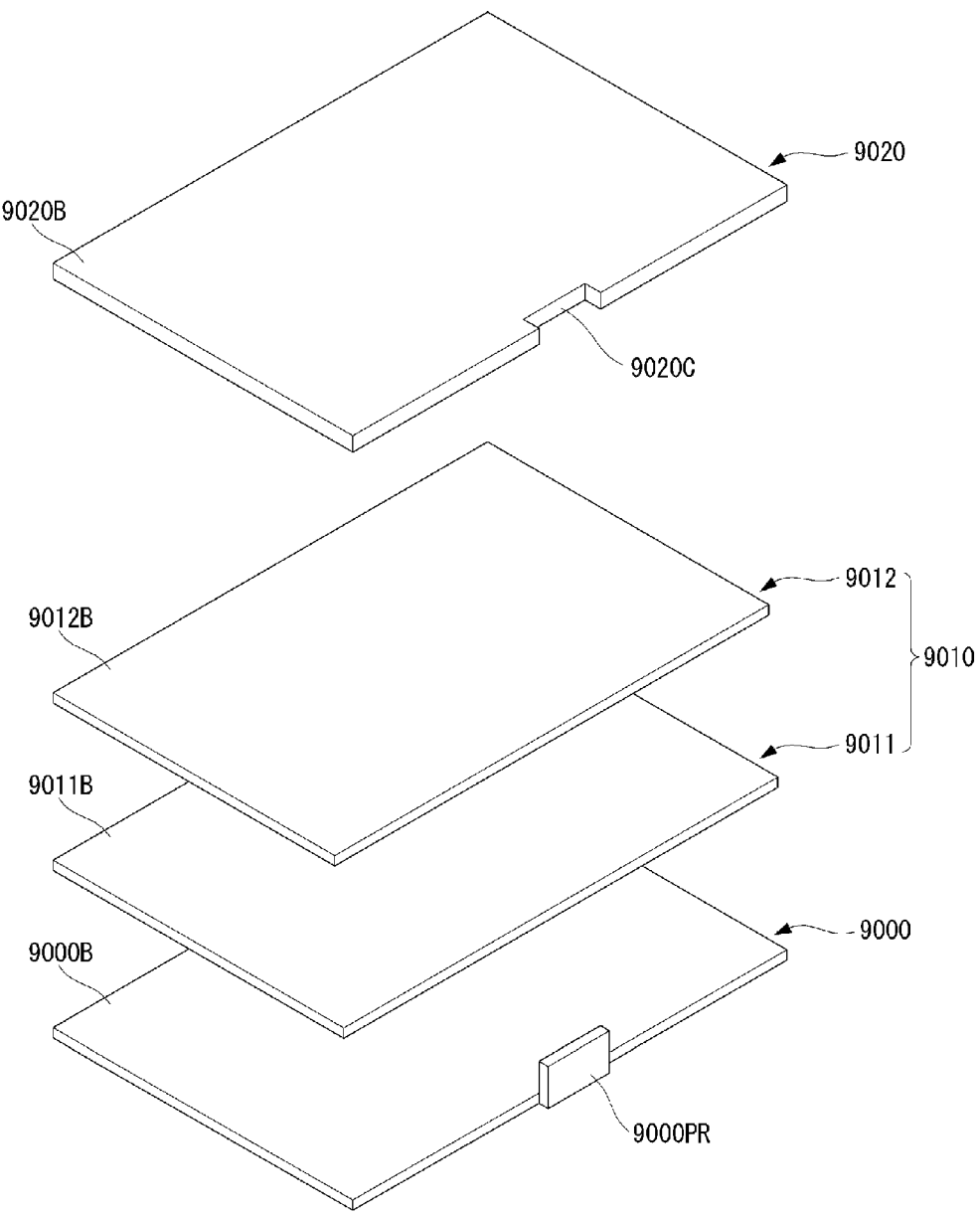

Alternatively, as shown in FIG. 44, a body portion 9020B of the diffusion plate 9020 may have a groove 9020C, and the reflective polarizer 9000 may include a protrusion 9000PR corresponding to the groove 9020C of the diffusion plate 9020. Further, the horizontal prism sheet 9012 and the vertical prism sheet 9011 may not include a protrusion.

In this instance, the protrusion 9000PR of the reflective polarizer 9000 may be inserted into the groove 9020C of the diffusion plate 9020, and thus the reflective polarizer 9000 may be coupled with the diffusion plate 9020. Further, the horizontal prism sheet 9012 and the vertical prism sheet 9011 between the reflective polarizer 9000 and the diffusion plate 9020 may be surrounded and supported by the reflective polarizer 9000 and the diffusion plate 9020.

Figure 45:
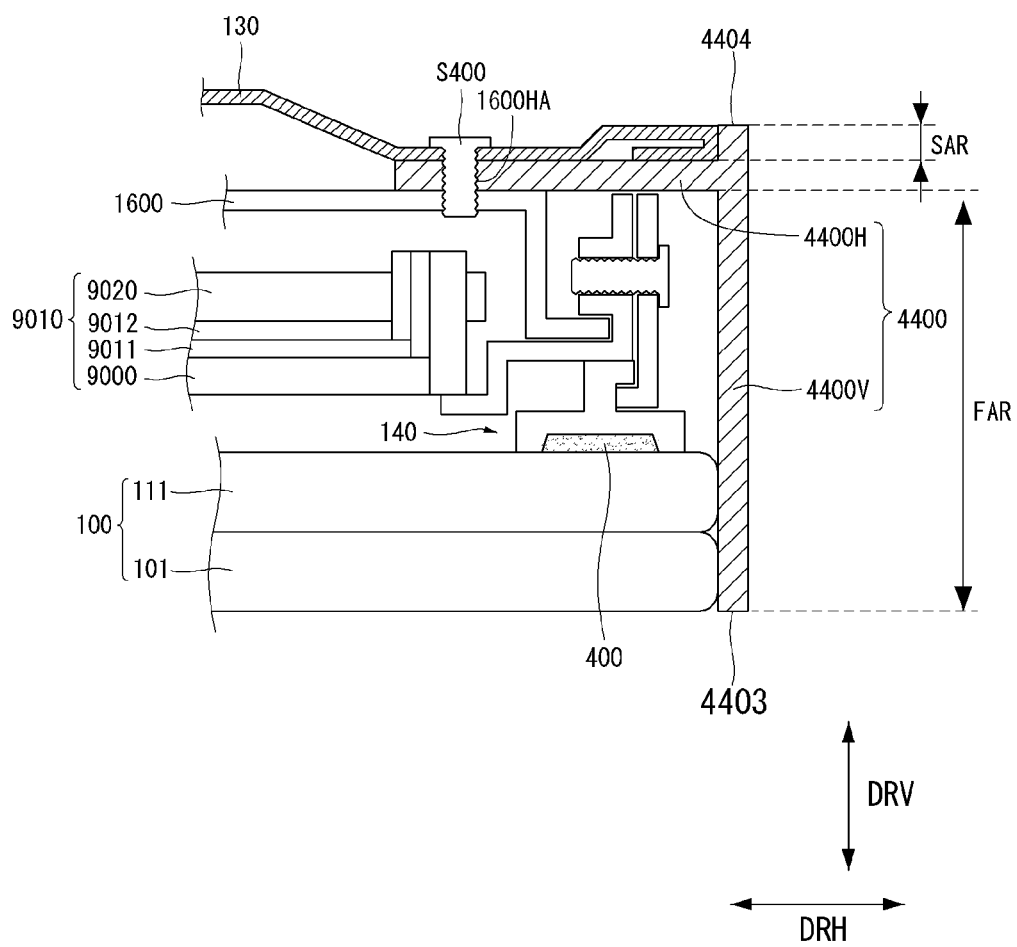

As shown in FIG. 45, ends of the above-described optical sheets 9000, 9010, and 9020 may be adjacent to the sidewall 4400V of the side cover 4400.

In other words, the ends of the optical sheets 9000, 9010, and 9020 and an end of the display panel 100 may be positioned adjacent to the first area FAR of the side cover 4400.

Figure 46:
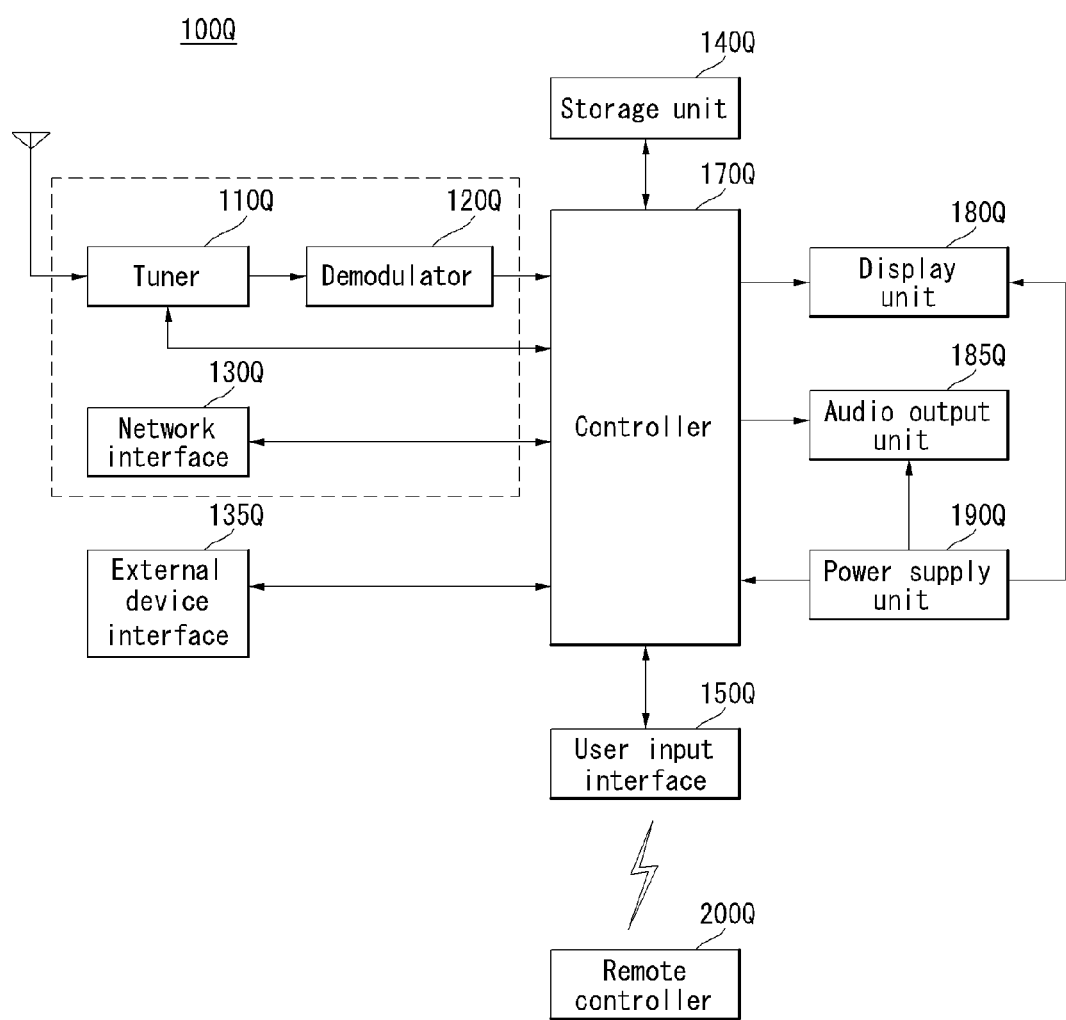
FIG. 46 illustrates another configuration of a display device according to an example embodiment of the invention.

FIG. 46 illustrates another configuration of the display device according to the embodiment of the invention. In the following description, the descriptions of the configuration and the structure described above are omitted. Hereinafter, a broadcasting signal receiver is used as an electronic device, to which the display device according to the embodiment of the invention is applied. The display device according to the embodiment of the invention may be applied to other electronic devices such as cell phones.

A display unit 180Q shown in FIG. 46 may correspond to the display device shown in FIGS. 1 to 45. Thus, the display device according to the embodiment of the invention may be referred to as the display unit 180Q shown in FIG. 46.

As shown in FIG. 46, a broadcasting signal receiver 100Q according to the embodiment of the invention may include a broadcasting receiving unit 105Q, an external device interface 135Q, a storage unit 140Q, a user input interface 150Q, a controller 170Q, a display unit 180Q, an audio output unit 185Q, a power supply unit 190Q, and a photographing unit (not shown). The broadcasting receiving unit 105Q may include a tuner 110Q, a demodulator 120Q, and a network interface 130Q.

If necessary, the broadcasting signal receiver 100Q may be designed so that it includes the tuner 110Q and the demodulator 120Q and does not include the network interface 130Q. On the contrary, the broadcasting signal receiver 100Q may be designed so that it includes the network interface 130Q and does not include the tuner 110Q and the demodulator 120Q.

The tuner 110Q tunes a radio frequency (RF) broadcasting signal, which corresponds to a channel selected by the user or all of previously stored channels, among RF broadcasting signals received through an antenna. Further, the tuner 110Q converts the tuned RF broadcasting signal into a middle frequency signal, a base band image signal, or a voice signal.

The demodulator 120Q receives a digital IF signal converted by the tuner 110Q and performs a demodulating operation.

A stream signal output by the demodulator 120Q may be input to the controller 170Q. The controller 170Q performs demultiplexing, image/voice signal processing, etc. Then, the controller 170Q outputs an image to the display unit 180Q and outputs a voice to the audio output unit 185Q.

The external device interface 135Q may connect an external device to the broadcasting signal receiver 100Q. For this, the external device interface 135Q may include an audio-visual (AV) input/output unit (not shown) or a wireless communication unit (not shown).

The network interface 130Q provides an interface for connecting the broadcasting signal receiver 100Q to a wired/wireless network including an internet network. The network interface 130Q may correspond to the wireless communication unit, which was described in detail above.

The storage unit 140Q may store a program for the signal processing of the controller 170Q and the control operation of the controller 170Q or may store the processed image signal, the processed voice signal, or a data signal.

The user input interface 150Q may transmit the signal the user inputs to the controller 170Q, or may transmit the signal from the controller 170Q to the user.

For example, the user input interface 150Q may receive and process the control signal indicating the turn-on or turn-off operation, the channel selection, the screen setting, etc. from a remote controller 200Q based on various communication manners such as a RF communication manner and an infrared communication manner. Alternatively, the user input interface 150Q may operate so that the control signal from the controller 170Q is transmitted to the remote controller 200Q.

For example, the user input interface 150Q may transmit a control signal, which is input from a power key, a channel key, a volume key, a local key, etc., to the controller 170Q.

The controller 170Q may perform the demultiplexing processing on the stream input through the tuner 110Q, the demodulator 120Q, or the external device interface 135Q or may perform the processing of demultiplexed signals, thereby generating or outputting the signals for outputting the image or the voice.

The image signal processed by the controller 170Q may be input to the display unit 180Q and may display an image corresponding to the image signal. Further, the image signal processed by the controller 170Q may be input to an external output device through the external device interface 135Q.

The voice signal processed by the controller 170Q may be output to the audio output unit 185Q. Further, the voice signal processed by the controller 170Q may be input to the external output device through the external device interface 135Q.

The controller 170Q may control the entire operation of the broadcasting signal receiver 100Q. For example, the controller 170Q may control the tuner 110Q, so that the tuner 110Q tunes a RF broadcasting signal corresponding to a channel selected by the user or a previously stored channel.

The controller 170Q may control the broadcasting signal receiver 100Q using a user command or an internal program input through the user input interface 150Q.

The display unit 180Q may convert the image signal, the data signal, and an OSD signal, which are processed by the controller 170Q, or the image signal and the data signal which are received from the external device interface 135Q, into red, green, and blue signals and may generate a driving signal.

The audio output unit 185Q may receive the voice signal (for example, stereo signal, 3.1 channel signal, or 5.1 channel signal) processed by the controller 170Q and may output the voice.

The power supply unit 190Q supplies the power required in all of the components of the broadcasting signal receiver 100Q.

The remote controller 200Q transmits the user command the user inputs to the user input interface 150Q. For this, the remote controller 200Q may use Bluetooth, RF communication, infrared communication, Ultra-wideband (UWB), Zigbee, etc.

The remote controller 200Q may receive the image, the voice, or the data signal output from the user input interface 150Q and may display the image, the voice, or the data signal or may output the voice or the vibration.

The broadcasting signal receiver 100Q may not include the tuner 110Q and the demodulator 120Q. Further, the broadcasting signal receiver 100Q may receive image contents through the network interface 130Q or the external device interface 135Q and may reproduce the image contents.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel including a front substrate and a back substrate;
a back cover positioned in the rear of the display panel; and
a backlight unit positioned between the display panel and the back cover, the backlight unit including a plurality of optical sheets,
wherein at least first optical sheet of the plurality of optical sheets includes an opening and a first body portion,
wherein at least second optical sheet of the other optical sheets except the first optical sheet among the plurality of optical sheets includes a protrusion corresponding to the opening of the first optical sheet and a second body portion,
wherein an extension portion is formed in any one of the first optical sheet and the second optical sheet,
wherein the opening is formed in the extension portion when the extension portion is formed in the first optical sheet, and the opening is formed in the first body portion when the extension portion is formed in the second optical sheet,
wherein the first body portion and the second body portion extend in a first direction, and
wherein the extension portion extends from the first body portion in a second direction when the extension portion is formed in the first optical sheet, and the extension portion extends from the second body portion in the second direction when the extension portion is formed in the second optical sheet, the second direction being different from the first direction.

2. The display device of claim 1, wherein a thickness of the first optical sheet is less than a thickness of the second optical sheet.

3. The display device of claim 1, wherein at least one hole is formed between the first body portion and the extension portion or the second body portion and the extension portion.

4. The display device of claim 1,
wherein the protrusion extends from the second body portion in the first direction and passes through the opening of the first optical sheet when the extension portion is formed in the first optical sheet, and
wherein the protrusion is the same with the extension portion, extends from the second body portion in the second direction, and passes through the opening of the first optical sheet when the extension portion is formed in the second optical sheet.

5. The display device of claim 4, wherein the plurality of optical sheets include a third optical sheet between the first optical sheet and the second optical sheet when the extension portion is formed in the first optical sheet,
wherein the third optical sheet includes:
a third body portion extending in the first direction;

an extension portion extending from the third body portion in the second direction; and
an opening formed in the extension portion.

6. The display device of claim 5, wherein the opening of the third optical sheet overlaps the opening of the first optical sheet.

7. The display device of claim 6, wherein the protrusion of the second optical sheet passes through the opening of the first optical sheet and the opening of the third optical sheet.

8. The display device of claim 6, wherein a size of the opening of the third optical sheet is equal to or greater than a size of the opening of the first optical sheet.

9. The display device of claim 5, wherein a width of the first body portion of the first optical sheet in the first direction is greater than a width of the third body portion of the third optical sheet in the first direction.

10. The display device of claim 5, wherein the first optical sheet is positioned between the display panel and the third optical sheet,
wherein the second optical sheet is positioned between the back cover and the third optical sheet.

11. The display device of claim 10, wherein the plurality of optical sheets include a fourth optical sheet between the second optical sheet and the back cover,
wherein a length of the extension portion of the first optical sheet and a length of the extension portion of the third optical sheet are greater than a thickness of the second optical sheet and are equal to or less than a sum of the thickness of the second optical sheet and a thickness of the fourth optical sheet.

12. The display device of claim 11, wherein an end of the extension portion of the first optical sheet and an end of the extension portion of the third optical sheet are positioned on the side of the fourth optical sheet.

13. The display device of claim 12, wherein the thickness of the fourth optical sheet is equal to or greater than the thickness of the second optical sheet.

14. The display device of claim 1, wherein the plurality of optical sheets include:
a diffusion plate positioned on the side of the back cover; and
a prism sheet and a reflective polarizer positioned between the diffusion plate and the display panel.

15. The display device of claim 4, wherein the plurality of optical sheets include a third optical sheet between the first optical sheet and the second optical sheet when the extension portion is formed in the second optical sheet, and
wherein the third optical sheet includes:
a third body portion extending in the first direction; and
an extension portion extending from the third body portion in the second direction.

16. The display device of claim 15, wherein the extension portion of the third optical sheet overlaps the extension portion of the second optical sheet.

17. The display device of claim 16, wherein the extension portion of the second optical sheet and the extension portion of the third optical sheet pass through the opening of the first optical sheet.

18. The display device of claim 16, wherein a size of the extension portion of the third optical sheet is equal to or smaller than a size of the extension portion of the second optical sheet.

19. The display device of claim 15, wherein a width of the second body portion of the second optical sheet in the first direction is greater than a width of the third body portion of the third optical sheet in the first direction.

20. The display device of claim 1, further comprising a side cover covering the side of the display panel.

21. The display device of claim 20, wherein the side cover includes a first portion extending in a vertical direction and a second portion extending from the first portion in a horizontal direction,
wherein an end of the back cover is positioned in the second portion,
wherein the side cover and the back cover each have a hole, and
wherein the hole of the side cover and the hole of the back cover are aligned so that a fastening member passes through the holes.

22. A display device comprising:
a display panel including a front substrate and a back substrate;
a back cover positioned in the rear of the display panel;
a backlight unit positioned between the display panel and the back cover, the backlight unit including a plurality of optical sheets; and
a side cover covering the side of the display panel, the side cover including a first portion extending in a vertical direction and a second portion extending from the first portion in a horizontal direction,
wherein an end of the back cover is positioned in the second portion,
wherein the side cover and the back cover each have a hole,
wherein the hole of the side cover and the hole of the back cover are aligned so that a fastening member passes through the holes,
wherein at least first optical sheet of the plurality of optical sheets includes an opening, and
wherein at least second optical sheet of the other optical sheets except the first optical sheet among the plurality of optical sheets includes a protrusion corresponding to the opening of the first optical sheet.

23. The display device of claim 22, wherein the first portion of the side cover includes a first end portion, a second end portion opposite the first end portion, a first area between the first end portion and the second portion, and a second area between the second end portion and the second portion, and
wherein the end of the back cover is positioned in the second area.

24. The display device of claim 23, wherein an end of the display panel and ends of the plurality of optical sheets are positioned adjacent to the first area of the side cover.

* * * * *